(12) United States Patent
Raj et al.

(10) Patent No.: US 12,333,590 B2
(45) Date of Patent: Jun. 17, 2025

(54) SYSTEMS AND METHODS FOR RECOMMENDED SORTING OF SEARCH RESULTS FOR ONLINE SEARCHING

(71) Applicant: Capital One Services, LLC, McLean, VA (US)

(72) Inventors: Rohan Vimal Raj, Plano, TX (US); Shamoon Kidwai, Richardson, TX (US); Cole Coen, Celina, TX (US); Aniketh Bothra Anoopchand Bothra, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 219 days.

(21) Appl. No.: 17/823,177

(22) Filed: Aug. 30, 2022

(65) Prior Publication Data

US 2024/0070743 A1    Feb. 29, 2024

(51) Int. Cl.
G06Q 30/06       (2023.01)
G06Q 30/0204    (2023.01)
G06Q 30/0601    (2023.01)

(52) U.S. Cl.
CPC ..... *G06Q 30/0631* (2013.01); *G06Q 30/0205* (2013.01); *G06Q 30/0627* (2013.01)

(58) Field of Classification Search
CPC .......... G06Q 30/0631; G06Q 30/0205; G06Q 30/0627
USPC ...................................................... 705/26.7
See application file for complete search history.

(56) References Cited

U.S. PATENT DOCUMENTS

| 8,326,826 | B1 * | 12/2012 | Upstill ................. G06F 16/951 |
| | | | 707/723 |
| 8,832,100 | B2 | 9/2014 | Ramer et al. |
| 9,542,453 | B1 | 1/2017 | Brukman et al. |
| 10,127,591 | B1 | 11/2018 | Wollmer et al. |
| 11,004,164 | B2 * | 5/2021 | Lantz ....................... G06N 7/01 |

(Continued)

FOREIGN PATENT DOCUMENTS

WO    WO-2019129520 A1 *  7/2019  ......... G06F 16/2428

OTHER PUBLICATIONS

Nizamuddin Siddiqui, "How to perform group-wise linear regression for a data frame in R?", Tutorials Point, Nov. 7, 2020, https://www.tutorialspoint.com/how-to-perform-group-wise-linear-regression-for-a-data-frame-in-r#:~:text=The%20group%E2%88%92wise%20linear%20regression,for%20each%20of%20the%20group.

(Continued)

*Primary Examiner* — Yogesh C Garg
(74) *Attorney, Agent, or Firm* — Bookoff McAndrews, PLLC

(57) ABSTRACT

A method may include receiving data related to a plurality of items and processing the data using a machine learning model. The machine learning model may have been trained to output a score for each of the plurality of items based on one or more target variables and to process the data using a grouped linear regression for groups of items based on sub-divisions of the groups. The method may include storing the output in a data store. Each entry in the data store may include at least an item identifier for an item, a group name, and the score. The method may include receiving search criteria for a search and identifying a set of search results in a group of items. The method may include determining an order of the set of search results and outputting the set of search results.

20 Claims, 18 Drawing Sheets

(56) References Cited

U.S. PATENT DOCUMENTS

| | | | |
|---|---|---|---|
| 11,442,999 B2* | 9/2022 | Mishra | G06F 16/24578 |
| 2018/0218435 A1 | 8/2018 | Bloem et al. | |
| 2019/0205402 A1* | 7/2019 | Sernau | G06Q 50/01 |
| 2019/0259499 A1* | 8/2019 | Hong | G16H 50/20 |
| 2019/0318010 A1* | 10/2019 | Tamir | G10L 15/07 |
| 2021/0240722 A1* | 8/2021 | Puthenputhussery | G06F 16/24578 |
| 2022/0230138 A1* | 7/2022 | Baek | G06Q 10/0633 |
| 2022/0245162 A1* | 8/2022 | Wang | G06F 16/24578 |
| 2023/0259575 A1* | 8/2023 | Hamedi | G06F 16/958 709/219 |

OTHER PUBLICATIONS

Nicolas Fiorini et al., "Best Match: New relevance search for PubMed", PLOS Biology, Aug. 18, 2018, https://journals.plos.org/plosbiology/article?id=10.1371/journal.pbio.2005343.

Dawei Yin et al., "Ranking Relevance in Yahoo Search", KDD '16: Proceedings of the 22nd ACM SIGKDD International Conference on Knowledge Discovery and Data Mining, Aug. 2016, pp. 323-332, https://www.kdd.org/kdd2016/papers/files/adf0361-yinA.pdf.

Sudeep Das, Ph.D. "Deeper Things: How Netflix Leverages Deep Learning in Recommendations and Search", Feb. 11, 2019, https://www.slideshare.net/SudeepDasPhD/deeper-things-how-netflix-leverages-deep-learning-in-recommendations-and-search.

* cited by examiner

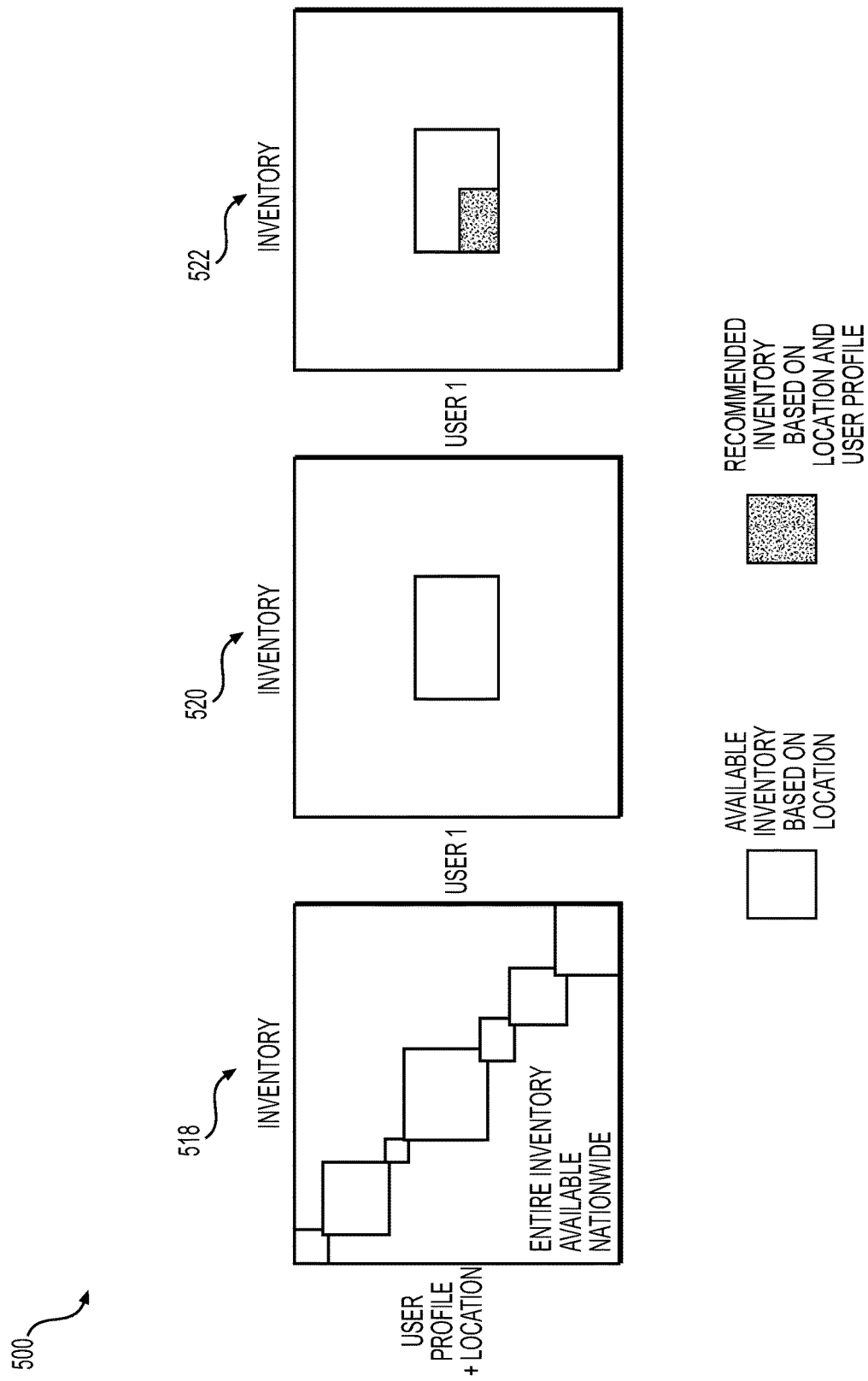

SYSTEMS AND METHODS FOR RECOMMENDED SORTING OF SEARCH RESULTS FOR ONLINE SEARCHING

TECHNICAL FIELD

Various embodiments of this disclosure relate generally to online searching techniques for sorting search results and, more particularly, to systems and methods for a recommended sorting of search results for online searching.

BACKGROUND

Various techniques for identifying and organizing search results are used in online searching. For example, gradient boosting machine (GBM) techniques (e.g., XGBRanker), logistic regression techniques, and deep learning models may be used in online searching applications, such as web search engines, document retrieval systems, and multimedia platforms. However, these techniques suffer from several issues. For example, the performance of logistic regression models may degrade when applied to complex target variable combinations. As another example, GBM ranker models may be difficult to implement and may need to be implemented on a machine learning platform. Thus, conventional techniques, including the foregoing, may provide poor trade-offs between implementation difficulty and sorting accuracy. In addition, the conventional techniques may fail to provide accurate sorting (e.g., ordering) of search results based on predicted user preferences, in some circumstances.

This disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for recommended sort for online searching.

A computer-implemented method for rank ordering a set of search results may include receiving, by a server device, data related to a plurality of items and processing the data using a machine learning model. The machine learning model may have been trained to output a score for each of the plurality of items based on one or more target variables associated with the plurality of items. The machine learning model may have been further trained to process the data using a grouped linear regression for groups of items based on sub-divisions of the groups. The score for the each of the plurality of items may be relative within each of the groups of items. The method may include storing the output from the machine learning model in a data store. Each entry in the data store may include at least an item identifier for an item, a group name for the item, and the score for the item. The method may include receiving, from a user device, search criteria for a search of the plurality of items and identifying, from the data store, a set of search results in a group of items based on the search criteria. The method may include determining an order of the set of search results in the group based on the score for the each of the plurality of items in the set of search results and outputting, for display via the user device, the set of search results in the order.

A server device may include at least one memory storing instructions and at least one processor executing the instructions to perform operations for rank ordering a set of search results. The operations may include receiving data related to a plurality of items and processing the data using a machine learning model. The machine learning model may have been trained to output a score for each of the plurality of items based on one or more target variables associated with the plurality of items. The machine learning model may have been further trained to process the data using a grouped linear regression for groups of items based on sub-divisions of the groups. The score for the each of the plurality of items may be relative within each of the groups of items. The operations may include storing the output from the machine learning model in a data store. Each entry in the data store may include at least an item identifier for an item, a group name for the item, and the score for the item. The operations may include receiving, from a user device, search criteria for a search of the plurality of items and identifying, from the data store, a set of search results in a group of items based on the search criteria. The operations may include determining an order of the set of search results in the group based on the score for the each of the plurality of items in the set of search results and outputting, for display via the user device, the set of search results in the order.

A non-transitory computer-readable medium may store instructions that, when executed by a processor, cause the processor to perform a method for rank ordering of search results. The method may include receiving data related to a plurality of items and processing the data using a machine learning model. The machine learning model may have been trained to output a score for each of the plurality of items based on one or more target variables associated with the plurality of items. The machine learning model may have been further trained to process the data using a grouped linear regression for groups of items based on sub-divisions of the groups. The score for the each of the plurality of items may be relative within each of the groups of items. The method may include storing the output from the machine learning model in a data store. Each entry in the data store may include at least an item identifier for an item, a group name for the item, and the score for the item. The method may include receiving, from a user device, search criteria for a search of the plurality of items and identifying, from the data store, a set of search results in a group of items based on the search criteria. The method may include determining an order of the set of search results in the group based on the score for the each of the plurality of items in the set of search results and outputting, for display via the user device, the set of search results in the order.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 5A and 5B depict an example of personalized recommendations of search results in real time, according to one or more embodiments.

DETAILED DESCRIPTION OF EMBODIMENTS

Figure 1:
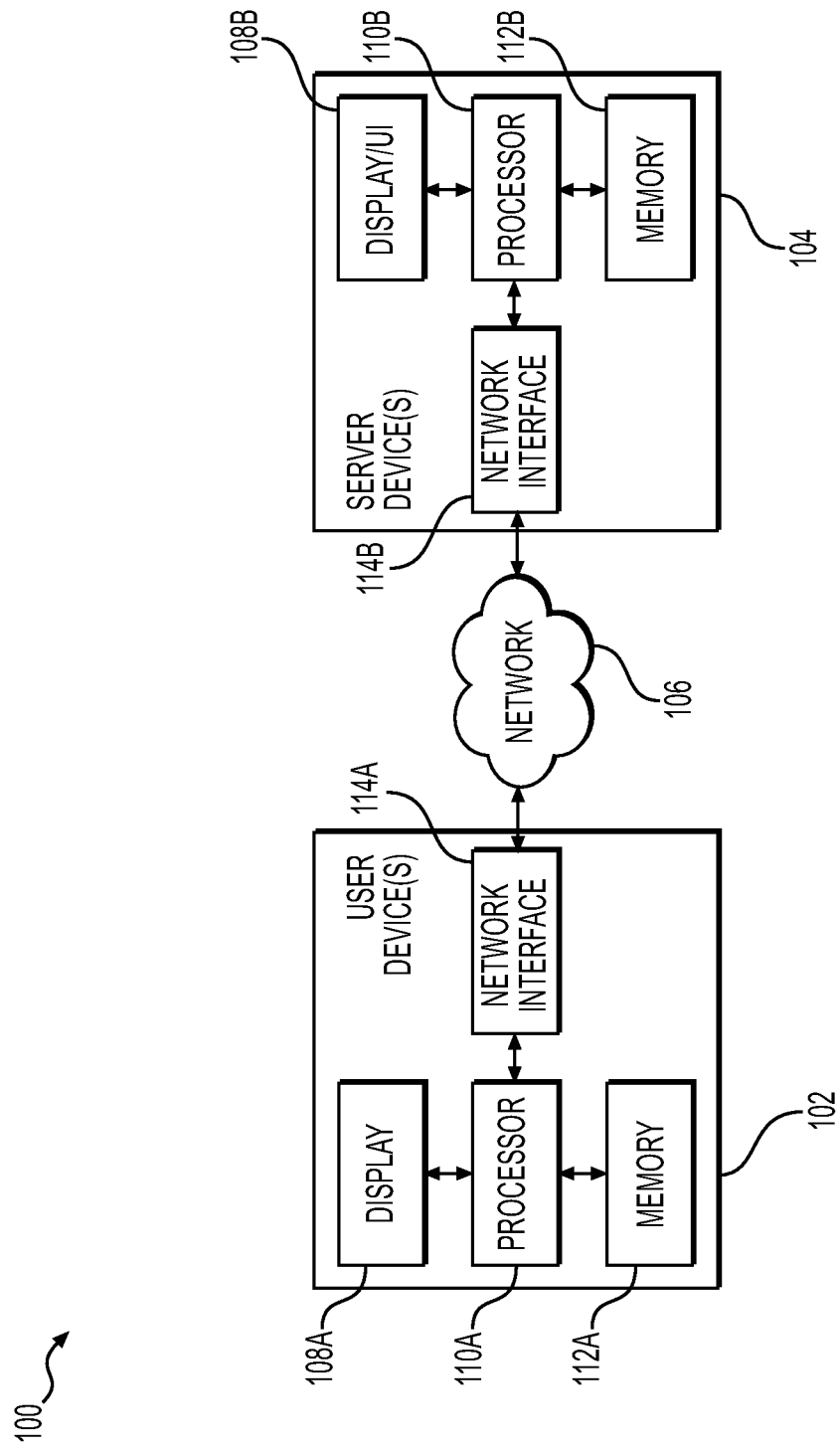
FIG. 1 depicts an exemplary environment for recommended sorting of search results for online searching, according to one or more embodiments.

According to certain aspects of the disclosure, methods and systems are disclosed for recommended sorting of search results for online searching, e.g., to predict and provide relevant search results based on search criteria. Conventional techniques may not provide relevant search results in certain circumstances, such as where there are several variables for assessing relevancy to search criteria. Accordingly, improvements in technology relating to sorting search results are needed.

As will be discussed in more detail below, in various embodiments, systems and methods are described for using a model to generate recommended sorting of search results to generate customized or personalized search results based on one or more target variables. Some embodiments may utilize a trained machine learning model. By training a machine-learning model, e.g., via supervised or semi-supervised learning, to learn associations between target variables of data and user click-through data, the trained machine-learning model may be usable to generate recommended sorting of search results in a customized or personalized manner.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider, and may be used interchangeably unless stated otherwise. The term "browser extension" may be used interchangeably with other terms like "program," "electronic application," or the like, and generally encompasses software that is configured to interact with, modify, override, supplement, or operate in conjunction with other software. As used herein, terms such as "model" or the like generally encompass a machine learning model, a computing model, or the like that receives data as input, performs some analysis or operation on the data, and outputs other data. Similarly, the terms such as "platform," "system," or the like generally encompass one or more computers connected together to perform one or more operations and may be used interchangeably unless stated otherwise.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a model may be configured to evaluate potential search results based on one or more target variables, which may be customizable or personalized to a user, and may provide the search results sorted based on relevance scores determined from the target variables. In some embodiments, processed data may be grouped, which may help facilitate more accurate prediction of recommended search results and/or sorting of the search results.

While several of the examples above involve searching for items (e.g., in an inventory), it should be understood that techniques according to this disclosure may be adapted to any suitable type of searchable information. It should also be understood that the examples above are illustrative only. The techniques and technologies of this disclosure may be adapted to any suitable activity.

Presented below are various aspects of machine learning techniques that may be adapted to recommend sorting of search results. As will be discussed in more detail below, machine learning techniques adapted to evaluate potential search results according to one or more target variables, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 for recommended sorting of search results for online searching, according to one or more embodiments. The environment 100 may include one or more user devices 102, one or more server devices 104, and a network 106. Although FIG. 1 depicts a single user device 102, server device 104, and network 106, the embodiments described herein are applicable to environments 100 that include two or more user devices 102, server devices 104, and/or networks 106 in any suitable arrangement.

The user device 102 may include a display 108A, a processor 110A, a memory 112A, and/or a network interface 114A. The user device 102 may be a mobile device, such as a smartphone, a cell phone, a tablet, a laptop computer, etc., a desktop computer, and/or the like. The user device 102 may execute, by the processor 110A, one or more instructions stored in the memory 112A to, e.g., generate recommended sorting of search results, or train and/or use one or more machine learning models to generate the recommended sorting, as described elsewhere herein. One or more components of the user device 102 may generate, or may cause to be generated, one or more graphic user interfaces (GUIs) based on instructions/information stored in the memory 112A, instructions/information received from the server device 104, and/or the like and may cause the GUIs to be displayed via the display 108A. The GUIs may be, e.g., mobile application interfaces or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display 108B, a processor 110B, a memory 112B, and/or a network interface 114B. The server device 104 may be a computer, system of computers (e.g., rack server(s)), or a cloud service computer system (e.g., in a data center). The server device 104 may execute, by the processor 110B, one or more instructions stored in the memory 112B to, e.g., generate recommended sorting of search results, or train and/or use one or more machine learning models to generate the recommended sorting, as described elsewhere herein. One or more components of the server device 104 may generate, or may cause to be generated, one or more graphic user interfaces (GUIs) based on instructions/information stored in the memory 112B, instructions/information received from the user device 102, and/or the like and may cause the GUIs to be displayed via the display 108B.

The network 106 may include one or more wired and/or wireless networks, such as the Internet, an intranet, a wide area network ("WAN"), a local area network ("LAN"), a personal area network ("PAN"), a cellular network (e.g., a 3G network, a 4G network, a 5G network, etc.) or the like. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 102 and the server device 104 may be connected via the network 106, using one or more standard communication protocols. The user device 102 and the server device 104 may transmit and receive messages from each other across the network 106, as discussed in more detail below.

As discussed in further detail below, the one or more components of exemplary environment 100 may process data from one or more user devices 102 and/or one or more server devices 104. Additionally, or alternatively, and as discussed in further detail below, the one or more components of exemplary environment 100 may generate, store, train and/or use a machine-learning model for generating recommended sorting of search results. The exemplary environment 100 or one of its components may include or be in operable communication with a machine-learning model and/or instructions associated with the machine-learning model, e.g., instructions for generating a machine-learning model, training the machine-learning model, using the machine-learning model, etc. The exemplary environment 100 or one of its components may include instructions for retrieving data, adjusting data, e.g., based on the output of the machine-learning model, and/or operating a display to output data, e.g., as adjusted based on the machine-learning model. The exemplary environment 100 or one of its components may include, provide, obtain, and/or generate training data.

In some embodiments, a system or device other than the components shown in the exemplary environment 100 may be used to generate and/or train the machine-learning model. For example, such a system may include instructions for generating and/or obtaining the machine-learning model, the training data and ground truth, and/or instructions for training the machine-learning model. A resulting trained-machine-learning model may then be provided to the exemplary environment 100 or one of its components and, for example, stored in the memory 112A and/or 112B.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning model, unsupervised learning where, e.g., the sample of training data may not include pre-assigned labels or scores to aid the learning process or may utilize semi-supervised learning where a combination of training data with pre-assigned labels or scores and training data without pre-assigned labels or scores is used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., may be used to compare the output of the trained model with the ground truth for that portion of the training data to evaluate an accuracy of the trained model. The training of the machine-learning model may be configured to cause the machine-learning model to learn associations between training data (e.g., computing system data) and ground truth data, such that the trained machine-learning model is configured to determine an output in response to the input data based on the learned associations.

In various embodiments, the variables of a machine-learning model may be interrelated in any suitable arrangement in order to generate the output. For example, in some embodiments, the machine-learning model may include an architecture that is configured to determine a relevance score for data from a computing system based on values (e.g., historical or predicted values) for one or more target variables for the data (e.g., determine a relevance score for a vehicle in an inventory based on the historical or predicted number of vehicle details page (VDP) (or item details page) views for the vehicle). For example, the machine-learning model may include one or more neural networks configured to identify features in the data, and may include further architecture, e.g., a connected layer, neural network, etc., configured to determine a relationship between the identified features in order to determine a location in the data. In certain embodiments, the machine learning model may include a single node for classification, as described elsewhere herein.

Although depicted as separate components in FIG. 1, it should be understood that a component or portion of a component in the exemplary environment 100 may, in some embodiments, be integrated with or incorporated into one or more other components. For example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of recommended sorting of search results or of the machine-learning model and/or how it may be trained or used to generate the recommended sorting are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The example environment 100 described above is provided merely as an example, and may include additional, fewer, different, or differently arranged aspects than depicted in FIG. 1.

Figure 2:
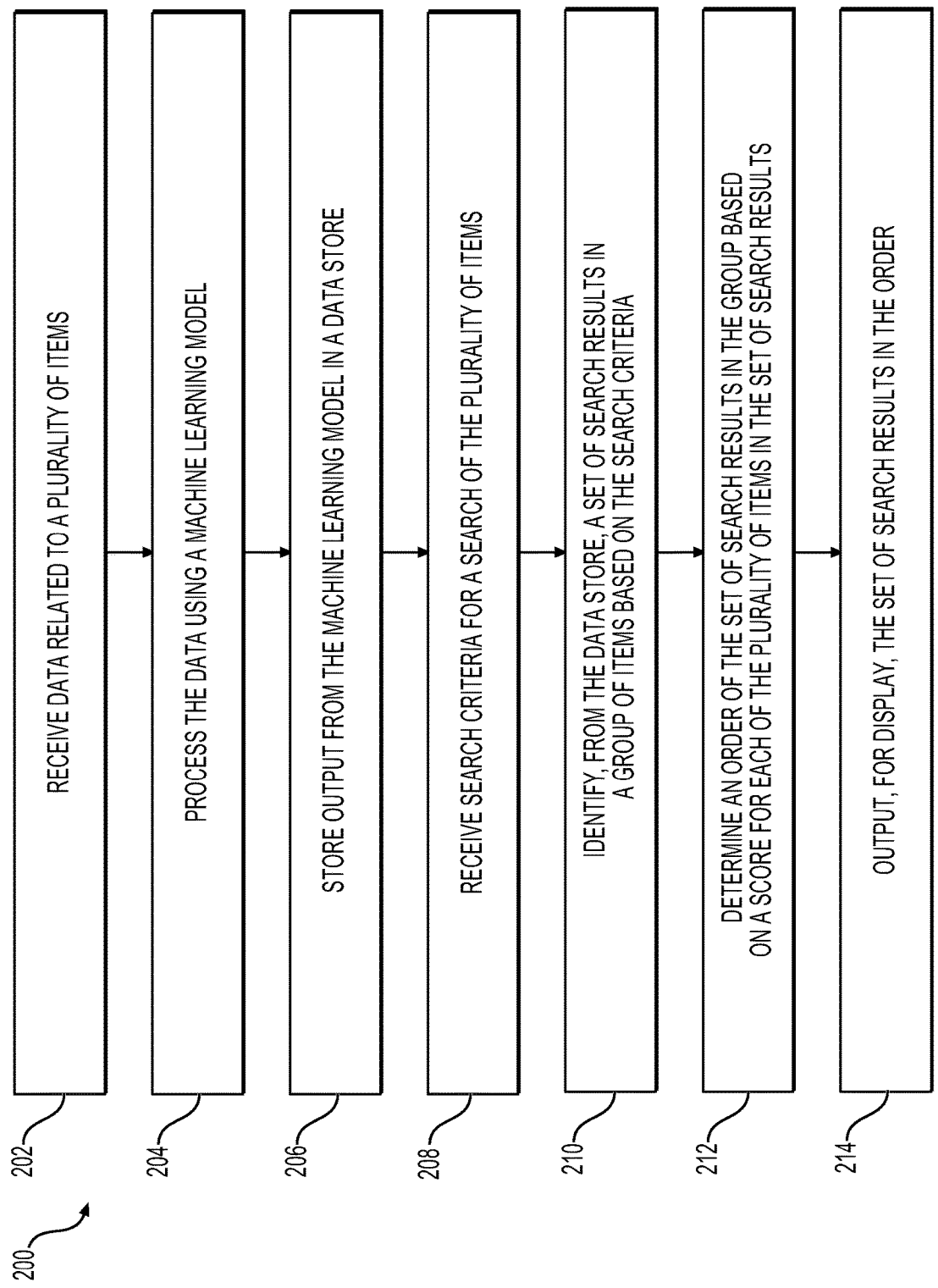
FIG. 2 depicts a flowchart of an exemplary method of determining a recommended sorting of search results for online searching, according to one or more embodiments.

FIG. 2 depicts a flowchart of an exemplary method 200 of determining a recommended sorting of search results for online searching, according to one or more embodiments. In some embodiments, the method 200 may be performed by a server device 104. In other embodiments, the method 200 may be performed by the user device 102 (e.g., an application or browser extension installed on the user device 102).

At step 202, the method 200 may include receiving data related to a plurality of items. For example, the server device 104 may receive the data. The plurality of items may be physical items, such as in an inventory of items, or non-physical items, such as a set of electronic documents or images in a database. As a specific example, the plurality of items may include an inventory of vehicles (e.g., cars, trucks, motorcycles, boats, planes, etc.) and the data received at step 202 may include makes, models, production years, body styles, conditions, etc. for each of the vehicles in the inventory. In this way, the data received at step 202 may be descriptive of the plurality of items and may vary depending on the type of items and/or the implementation context.

The server device 104 may receive the data at step 202 from one or more other server devices 104 (e.g., from a database or data store of items), from one or more user devices 102 (e.g., as an upload of data files to the server device 104 and/or as input through a user interface displayed on the user device 102), and/or the like. The server device 104 may receive the data at step 202 based on sending a request to the one or more other server devices 104 and/or the one or more user devices 102, based on a user of the one or more server devices 104 and/or user devices 102 sending the data to the server device 104, based on a schedule, and/or the like.

The method 200 may include, at step 204, processing the data using a machine learning model. For example, the server device 104 may process the data using a machine learning model hosted on or in communication with the server device 104. To process the data, the server device 104 may input the data to the machine learning model. For example, the server device 104 may input the data received at step 202 to the machine learning model. As a specific example for vehicles, the server device 104 may input data related to the production years, makes, and/or models for vehicles in an inventory. The server device 104 may process the data upon receiving the data at step 202, based on receiving a command from a user of a user device 102 and/or the server device 104 to process the data, at a scheduled time, and/or the like.

The machine learning model may include a grouped linear regression model where the items associated with the data are grouped according to one or more variables. For example, data related to vehicles may be grouped according to one or more of make, model, production year, condition, and/or the like. With grouped linear regression, certain embodiments may process first data for a first group of items using a first linear regression processing and may process second data for a second group of items using a second linear regression processing. The machine learning model may be trained on data that includes values for one or more target variables for the items and pre-determined relevance scores for the items. A target variable may include a variable associated with an item that the machine learning model may use to determine a relevance score for the item. For example, in an online vehicle searching context, a target variable may include historical or predicted webpage views or a number of user selections of a details page for the vehicle or group-wise webpage views (e.g., deciles/pentiles) or group-wise user selections, number of purchases of the same type of vehicle, number of test drives of the vehicle or vehicles of the same type, a year associated with the vehicle, a calculated book value of the vehicle, a vehicle sale amount, a vehicle mileage, an average vehicle sale amount for vehicles of the same year, make, model, trim, condition, and/or state, an average vehicle mileage for vehicles of the same year, body style, condition, and/or state, a difference between a vehicle sale amount and the average vehicle sale amount, a difference between a vehicle mileage and the average vehicle mileage, a ratio of a price deviation to a vehicle sale amount, a ratio of a mileage deviation to a vehicle mileage number, a vehicle mileage per gallon (e.g., city or highway mileage), a combined vehicle mileage for city and highway mileage, a number of images on a VDP, an exterior or interior color of the vehicle, a source of an image of the vehicle (e.g., dealership, company, no image, etc.), and/or the like.

As specific examples in a vehicle searching context, the target variables may include visits to a VDP, generated offers on a "build my offer" (BMO) page, visits to an offer page, visits to a dealership (RIC), suggested retail price (SRP), vehicle save counts, mileage deviation, price deviation, average search position, unique visitor count to an offer page or VDP, average number of interactions with a search result, number of images and/or interactions with the images on a web page for a vehicle, and/or the like. In this way, the machine learning model may be trained to evaluate the input data using the grouped linear regression model and may output a score (e.g., a relevance score) that indicates the relevance (e.g., expected appeal) of each item based on the target variable for an average user or customized for a particular user. For example, for vehicles, if the target variable is number of VDP views and the vehicles are grouped by the combination of production year/make/model, then the machine learning model may output a relevance score for each vehicle in a group based on the historical or predicted number of VDP views for each vehicle. The machine learning model may be further trained to process groups of items based on sub-divisions of the groups. For example, the sub-divisions may include deciles or pentiles for values of one or more target variables associated with the items, and the machine learning model may determine relevance scores based on the deciles or pentiles for the target variable values. As a specific example for a group that includes item A.1 with a target variable having a value of 100 and item A.2 with the target variable having a value of 2000, the machine learning model may assign a decile value of 1 to item A.1 and a decile value of 10 to time A.2 and may determine a higher relevance score for item A.2 than for item A.1 based on the higher decile value for item A.2.

In some embodiments, the server device 104 may process data for different groups of items using different machine learning models. For example, the server device 104 may process data for a first group using a first model and may process data for a second group using a second model. This may provide for more accurate processing relative to using a single model trained for multiple different groups.

The relevance score may be a numerical value on a range of values (e.g., a value of 1, 5, 10, 1.1, 5.4, etc. on a range from 0 to 10), may be a decimal value less than 1, may be a percentage (e.g., that indicates a likelihood out of 100% that the vehicle is relevant to the average user), and/or the like. The relevance scores for each of the items may be relative within each of the groups of items. For example, the same score may indicate different relative relevancies within different groups. Alternatively, in some embodiments, the relevance scores may be normalized across groups so that items from different groups can be ranked against each other.

Prior to processing or receiving the data, the method 200 may include configuring or training the machine learning model. For example, certain embodiments may include performing a path analysis of multiple target variables and selecting one or more target variables based on a result of the path analysis. Additionally, or alternatively, the machine learning model may be trained on training data that includes values for target variables, corresponding pentiles/deciles for the values, and corresponding relevance scores.

At step 206, the method 200 may include storing output from the machine learning model in a data store. For example, the server device 104 may store output from the machine learning model in the data store. Each entry in the data store may include a unique identifier for each of the plurality of items, group-related information for each of the plurality of items (e.g., a group name or information that identifies the combination of variables for which the vehicles were grouped), and the relevance score. The data store may include a database, a data lake, and/or the like.

The method 200 may include, at step 208, receiving search criteria for a search of the plurality of items. For example, the server device 104 may receive the search criteria for the search. The server device 104 may receive the search criteria from a user device 102. For example, a user of the user device 102 may input the search criteria into a web browser or an application installed on the user device 102 and the web browser or the application may provide the search criteria to the server device 104 when the user selects a user interface element to initiate the search (e.g., a "Search" button). Additionally, or alternatively, the server device 104 may receive the search criteria from one or more other server devices 104. For example, when the user of the user device 102 initiates the search, the search query may be provided first to a web server device 104 that hosts a webpage and the web server device 104 may provide the search criteria to the server device 104 for processing.

The search criteria may include text, user selections (e.g., menu selections, radio button selections, etc.), a search query (e.g., in a structured query language (SQL)), and/or the like related to parameters for searching the data related to the plurality of items. For example, the search criteria may include search terms or phrases (e.g., text describing a year, a make, or a model for a vehicle), selections of sub-categories of items (e.g., selections of a year, a make, or a model for a vehicle from a menu of available years, makes, or models), and/or the like.

The method 200 may include, at step 210, identifying, from the data store, a set of search results in a group of items based on the search criteria. For example, the server device 104 may identify the set of search results. The server device 104 may identify the set of search results upon receiving the search criteria, after a delay after receiving the search criteria, based on receiving a command to identify the set of search results, and/or the like.

The set of search results may include data related to one or more of the items, a relevance score for each of the items, and/or the like. For example, the server device 104 may identify items that match the search criteria and may include data related to these items in the search results. The server device 104 may identify items that match any of the search criteria, that match one or more of the search criteria, and/or the like. The server device 104 may identify items that have a relevance score greater than a threshold or may identify items with the N highest relevance scores (e.g., the items with the 30 highest relevance scores). In this way, certain embodiments may conserve computing resources and/or reduce latency by optimizing the number of search results that are identified and returned to the user device 102.

In some embodiments, the server device 104 may identify the set of search results by identifying a group of items associated with the search criteria and then identifying the set of search results based on the identified group of items. For example, based on the combination of search criteria that a user inputs, the server device 104 may identify one or more groups that match the search criteria and may then select the set of search results from the group, e.g., based on relevance score.

The method 200 may include, at step 212, determining an order of the set of search results in the group based on a score for each of the plurality of items in the set of search results. For example, the server device 104 may determine an order of the set of search results based on the relevance score stored in the data store for each of the plurality of items. The server device 104 may determine the order from highest to lowest relevance score, from lowest to highest relevance score, and/or the like depending on whether a high or low relevance score indicates a higher or lower relevance of an item. The order may be based on groups of data. For example, if data from multiple groups of items is included in the set of search results, then the server device 104 may determine a first order for a first group, a second order for a second group, and so forth. Alternatively, the server device 104 may determine a single order for the set of search results regardless of whether multiple groups are included in the set of search results. For example, some embodiments described herein may determine relevance scores based on pentiles/deciles for values of the target variable within a group, thereby normalizing relevance scores across groups. In this case, the server device 104 may perform a mixed ranking of items in different groups (e.g., ranking an item from a first group as most relevant, ranking an item from a second group as next most relevant, etc.).

At step 214, the method 200 may include outputting, for display, the set of search results in the order. For example, the server device 104 may output, for display, the set of search results in the order. The server device 104 may output the set of search results based on determining the order, after receiving an instruction to output the set of search results, and/or the like.

The output may include providing the set of search results to a user device 102 and/or a server device 104 (e.g., a web server device 104). In connection with providing the set of search results, the server device 104 may provide data related to the order in which the set of search results are to be displayed, a layout of a webpage displaying the set of search results and associated information, information to be displayed when the user selects a search result and an organization of the information on a webpage, and/or the like.

The server device 104 may perform one or more other actions associated with outputting the set of search results. For example, the server device 104 may save the search in the data store or to a profile associated with the user of the user device 102, which may reduce latency of re-performing the search at a later time. Additionally, or alternatively, the server device 104 may provide search results that may be similar to the provided set of search results. For example, the server device 104 may identify other vehicles with the same make or year for a search of vehicles for a year, make, and model.

Additionally, or alternatively, the server device 104 may provide a message to a third party related to the set of search results or a selection of the search results. For example, and for a vehicle search, the server device 104 may send a message to a dealer or a financial institution that a user has viewed a vehicle, has selected user interface elements to request a sale offer or a financing offer, and/or the like. The server device 104 may then output, to the user device 102, information that includes the sale offer or the financing offer. In some embodiments, the server device 104 may store information for a sale offer or a financing offer or may be programed to determine this information based on the data related to the items (e.g., using a trained machine learning model).

Additionally, or alternatively, the server device 104 may update the machine learning model and/or the relevance score based on user interactions with the set of search results. For example, the server device 104 may monitor the user interactions, where different user interactions with the set of search results may indicate a higher or lower relevance to the user, and the server device 104 may monitor these interactions to adjust the relevance score or re-train the machine learning model based on the interactions. Continuing with the previous example, the server device 104 may reduce the relevance score for a vehicle which the user scrolls past compared to a vehicle for which the user views the VDP, and the server device 104 may adjust relevance scores presented to the user or other users in the future based on this information.

The example method 200 described above is provided merely as an example, and may include additional, fewer, different, or differently arranged aspects than depicted in FIG. 2.

Figure 3A:
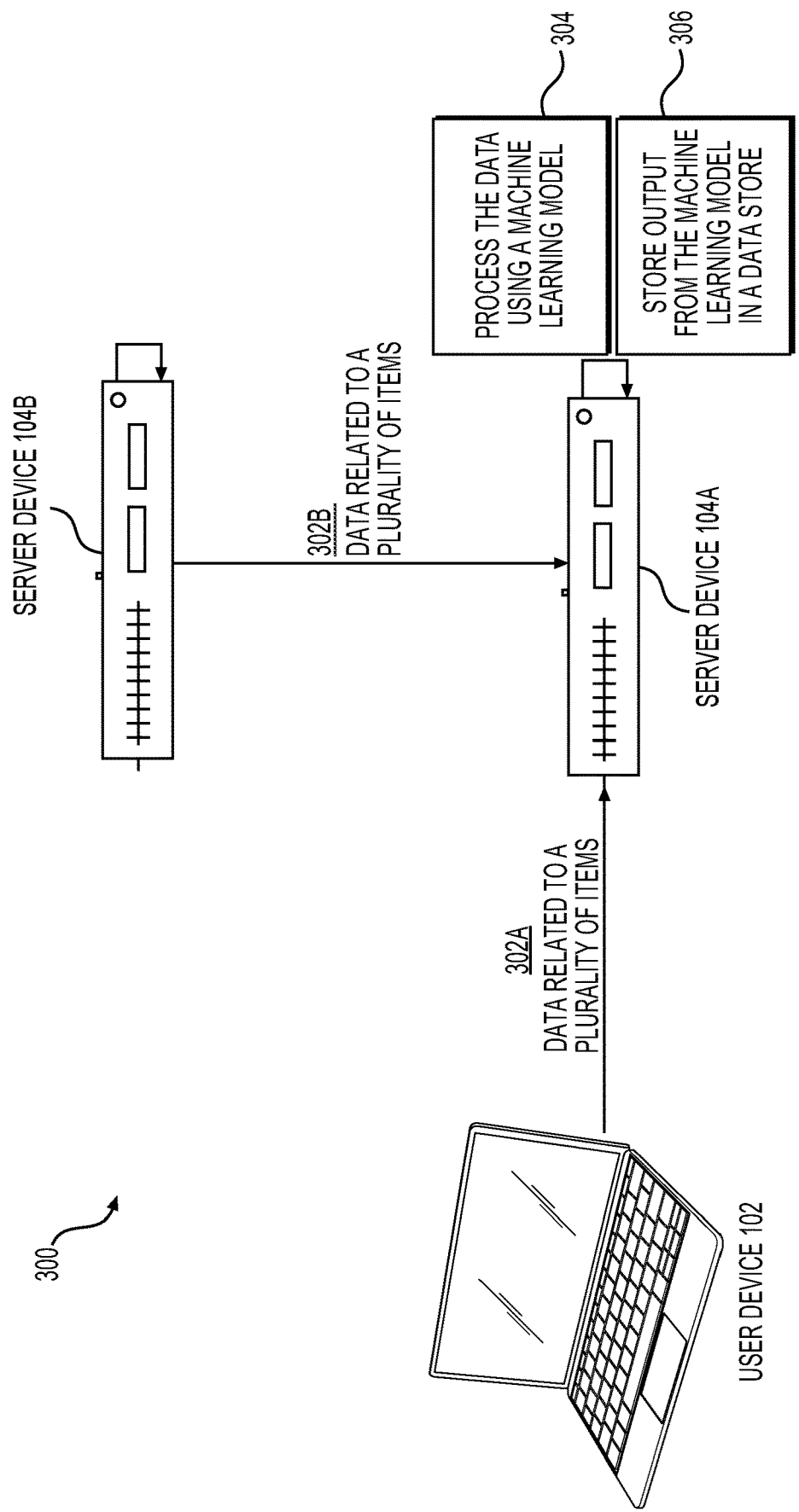
FIGS. 3A and 3B depict an example of recommended sorting of search results for online searching, according to one or more embodiments.
Figure 3B:
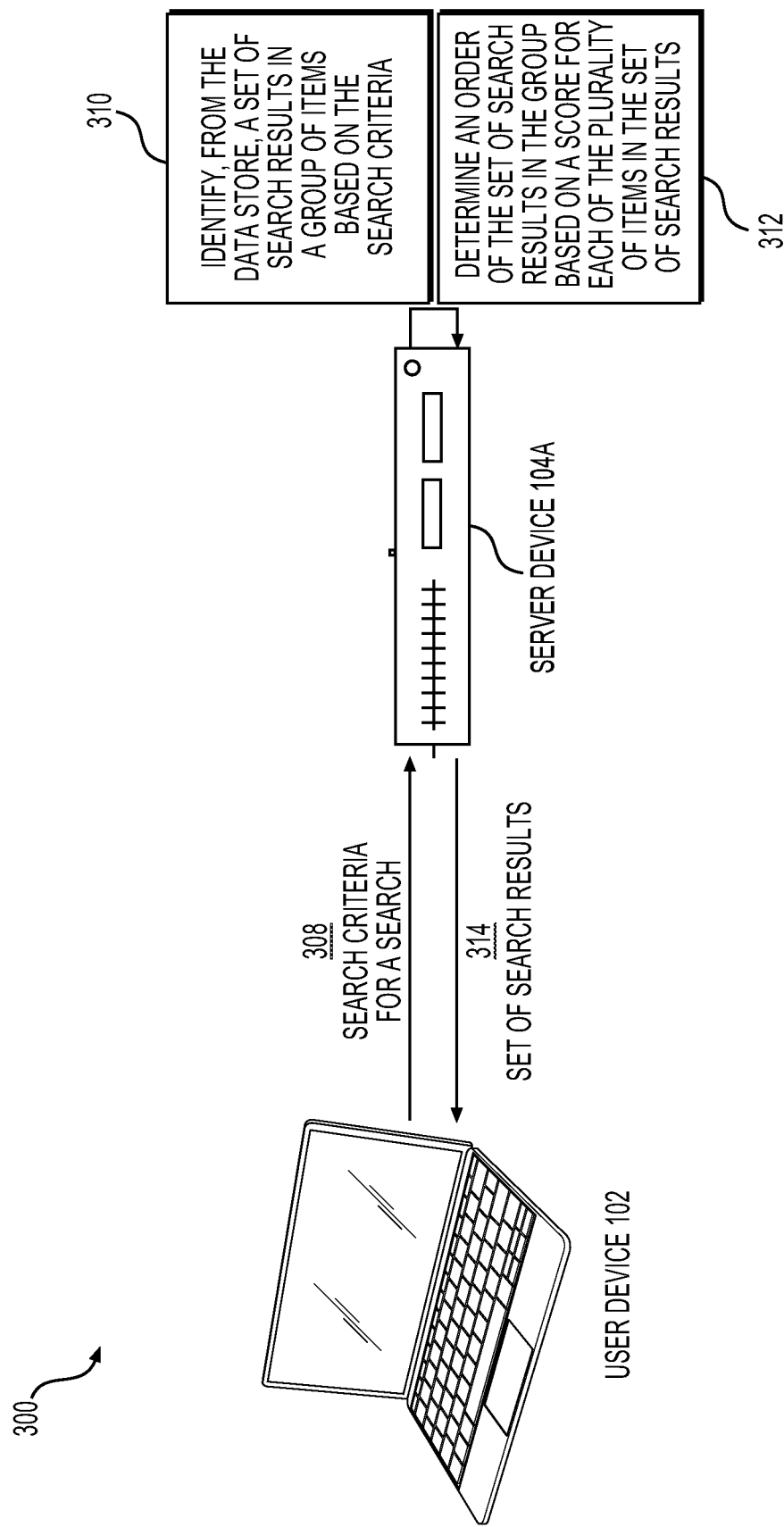

FIGS. 3A and 3B depict an example 300 of recommended sorting of search results for online searching, according to one or more embodiments. As illustrated, the example 300 includes a user device 102, a server device 104A, and a server device 104B. At 302A and 302B, the server device 104A may receive data related to a plurality of items from the user device 102 and/or the server device 104B, e.g., in a manner similar to that described above at step 202 of FIG. 2. The server device 104A may, at 304, process the data using a machine learning model, e.g., in a manner similar to that at step 204 of FIG. 2. For example, the server device 104A may process the data to determine relevance scores for each of the items. As illustrated at 306, the server device 104A may store output from the machine learning model in a data store, e.g., in a manner similar to that at step 206 of FIG. 2.

Turning to FIG. 3B, and as illustrated at 308, the server device 104A may receive search criteria for a search from the user device 102, e.g., in a manner similar to that at step 208 of FIG. 2. For example, the server device 104A may receive a search query that includes terms or phrases for searching the data related to the items. The server device 104A may, at 310, identify, from the data store, a set of search results in a group of items based on the search criteria, e.g., in a manner similar to that at step 210 of FIG. 2. As illustrated at 312, the server device 104A may determine an order of the set of search results in the group based on a score for each of the plurality of items in the set of search results, e.g., in a manner similar to that at step 212 of FIG. 2. The server device 104A may, at 314, output the set of search results to the user device 102 for display, e.g., in a manner similar to that at step 214 of FIG. 2.

The example 300 described above is provided merely as an example, and may include additional, fewer, different, or differently arranged aspects than depicted in FIGS. 3A and 3B.

Figure 4:
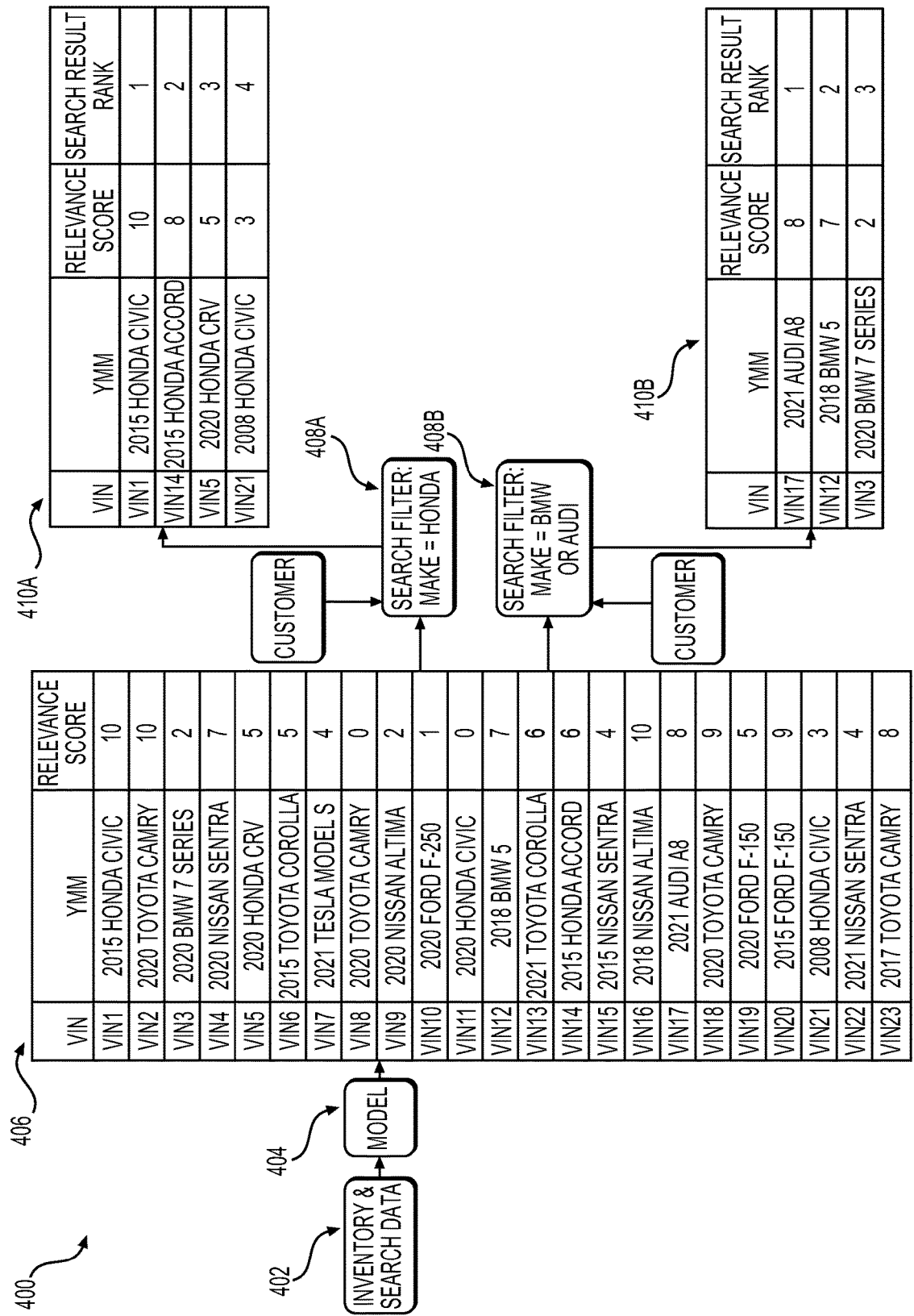
FIG. 4 depicts another example of recommended sorting of search results for online searching, according to one or more embodiments.

FIG. 4 depicts another example 400 of recommended sorting of search results for online searching, according to one or more embodiments. For example, FIG. 4 illustrates an example in a vehicle context. Certain embodiments illustrated in FIG. 4 may be implemented on a server device 104. As illustrated at 402, a server device 104 may receive inventory and/or search data. For example, the server device 104 may receive vehicle details for various vehicles, information related to a quality of a dealer of the vehicle (e.g., an average customer rating out of 5 for the dealer), a quality of a sale offer for the vehicle or of financing of the vehicle (e.g., based on the price of the vehicle relative to the price of other similar vehicles, based on an interest rate or term of a financing offer, etc.), and/or the like. As illustrated at 404, the server device 104 may input the data received at 402 to a model. For example, the model may be a grouped linear regression model trained to determine relevance scores for the vehicles based on the number of VDP views or VDP pentiles/deciles (e.g., pentile/decile values for the number of VDP views of each item in a group). As described elsewhere herein, the relevance score may represent an expected appeal or relevance that a vehicle or sale offer/financing offer has for an average customer or for a particular customer.

Example output from the model is illustrated at 406. As illustrated, the output may include a unique identifier for each vehicle in the inventory (e.g., a vehicle identification number (VIN) for each vehicle), a group name for a group of vehicles or values for a combination of variables used to group the vehicles (e.g., a combination of year, make, and model for each vehicle ("YMM")), and a relevance score for each vehicle. As illustrated at 408A and 408B, one or more customers may input, via one or more user devices 102, search criteria for a search filter. For example, the user may input one or more makes (e.g., a single make such as "Honda" or a combination of makes such as "BMW or Audi"). As illustrated at 410A and 410B, the server device 104 may output search results based on the search criteria. For example, the output at 410A may include vehicle data that matches the make "Honda" and the output at 410B may include vehicle data that matches the makes "BMW" or "Audi." The output may further include a rank for each of the search results ("SEARCH RESULT RANK" in FIG. 4) based on the relevance score for each item in the search results and the server device 104 may order the results based on the rank. As described elsewhere herein, the server device 104 may provide the output at 410A and 410B to one or more user devices 102 for display in addition to instructions for the manner in which the output is to be displayed.

The example 400 described above is provided merely as an example, and may include additional, fewer, different, or differently arranged aspects than depicted in FIG. 4.

Figure 5A:
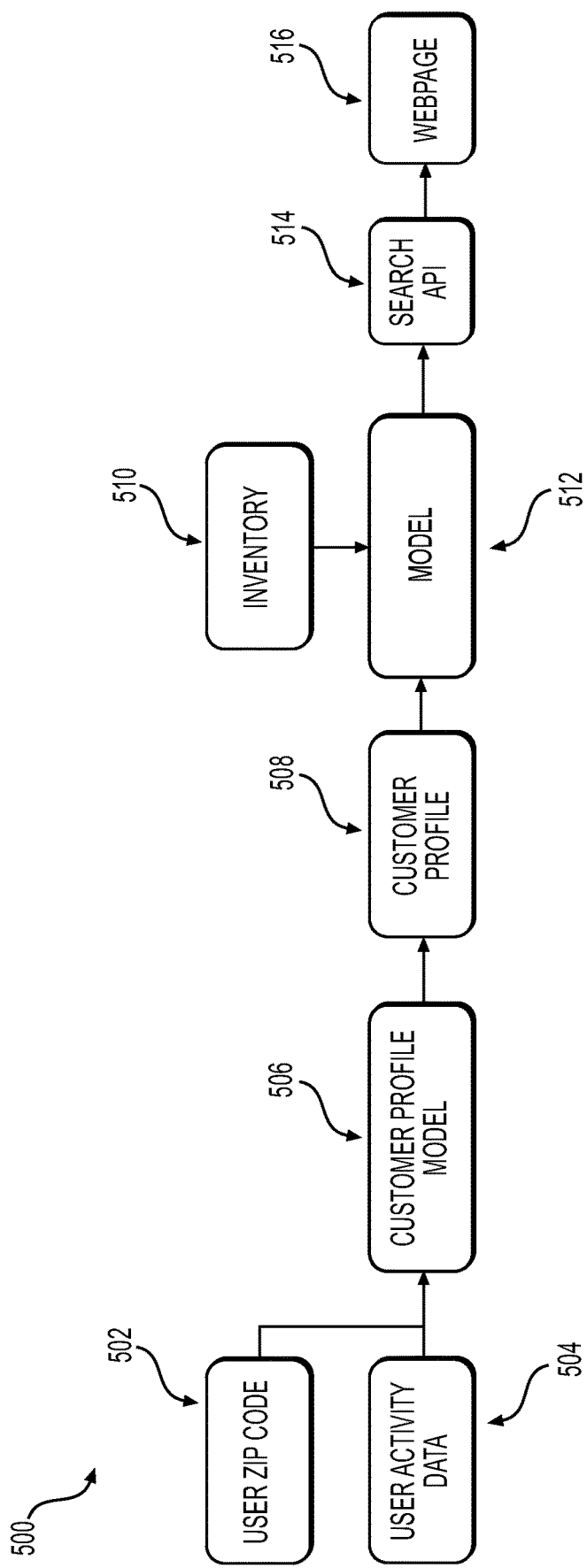

FIGS. 5A and 5B depict an example 500 of personalized recommendations of search results in real time, according to one or more embodiments. For example, the example 500 illustrates certain embodiments for providing personalized recommendations based on a user's search activity or a user's profile. In some embodiments, certain data may be stored, or associated, with a user or customer profile. For example, and as illustrated at 502 and 504, the data may include user zip code (or other location-related information) and user activity data (e.g., previous search criteria, interactions with previous search results, such as viewed search results or search results that the user indicated as being irrelevant), and/or the like. The data may be gathered and/or stored in real-time during the customer's use of search functionality. In this way, certain embodiments may utilize a streaming analytics pipeline of data for personalization of search-related services by segmenting users of the search system by customer profile.

As illustrated at 506, the data may be input to a customer profile model. For example, the customer profile model may be trained to generate a user profile specifically for the associated customer based on the data received at 502 and 504. As illustrated at 508, the customer profile model may operate to build a customer profile that includes personal data for a customer (e.g., name, age, location, etc.), types of vehicles previously owned or interested in, price range for a vehicle purchase, and/or the like. In this way, certain embodiments may provide real-time streaming analytics which can facilitate personalization by segmenting customers (e.g., website visitors) by profile. As illustrated, an available inventory 510 (e.g., of vehicles) may be input to a model 512. The model may be trained to generate relevance scores customized for the customer profile (e.g., rather than for an average customer). Additionally, or alternatively, the model may be built on A/B test data, as described elsewhere herein.

As illustrated at 514, the output from the model 512 may be provided to a search application programming interface (API). As illustrated at 516, the search API at 514 may provide the output to the a webpage for display via a user device 102.

FIG. 5B illustrates an example of identifying a subset of an available inventory based on a user profile for a user. Reference number 518 illustrates an entire inventory available for a user profile. Reference number 520 illustrates the inventory available based on a location of a user associated with the user profile. Reference number 522 illustrates the recommended inventory based on the location and the user's profile (e.g., based on relevance scores for vehicles in the inventory).

The example 500 described above is provided merely as an example, and may include additional, fewer, different, or differently arranged aspects than depicted in FIGS. 5A and 5B.

Figure 6:
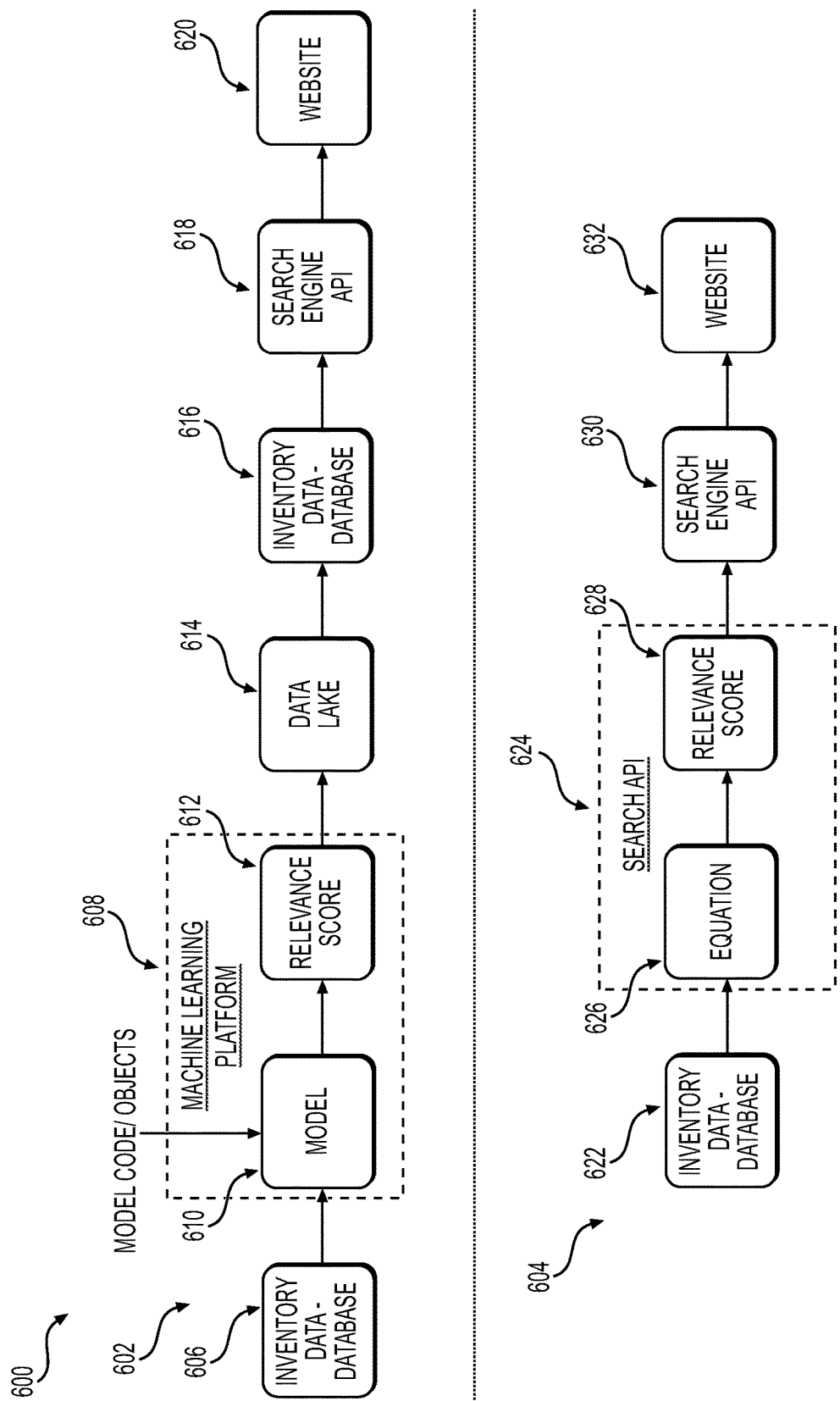
FIG. 6 depicts examples of hosting a personalized recommendation model on one or more computing platforms, according to one or more embodiments.

FIG. 6 depicts examples 600 of hosting a personalized recommendation model on one or more computing platforms, according to one or more embodiments. FIG. 6 illustrates a first example 602 where a model may be hosted on a machine learning platform and a second example 604 where the model may be hosted on a search API.

As illustrated at 606, inventory data (e.g., from a database) may be input to a machine learning platform 608 that hosts the model 610 that outputs a relevance score 612, in a manner similar to that described elsewhere herein. The relevance score 612 may be stored in a data lake 614 with inventory data. As illustrated at 616, the inventory data may be provided to a search engine API at 618, which may provide the inventory data to a website at 620 based on search criteria. The example 602 may be capable of hosting complex models and/or batch-run models. For example, the example 602 may be capable of hosting GBM models, linear regression models, and/or grouped linear regression models.

As illustrated at 622, in the second example 604, inventory data may be input to a search API 624. The search API 624 may use an equation 626 to determine relevance scores 628. As illustrated at 630, the relevance scores 628 may be provided, with search results, to a search engine API based on input of search criteria. As illustrated at 632, the search results and the relevance scores may be provided to a website for display via a user device 102. The example 604 may be capable of hosting models as the equation 626, which may provide a simpler architecture compared to the example 602. In this way, the example 604 may be easier to maintain and/or may have a faster implementation time compared to the example 602. In addition, the example 604 may be capable of hosting stream-run and/or batch-run models, such as linear regression and/or grouped-linear regression models.

The example 600 described above is provided merely as an example, and may include additional, fewer, different, or differently arranged aspects than depicted in FIG. 6.

Figure 7A:
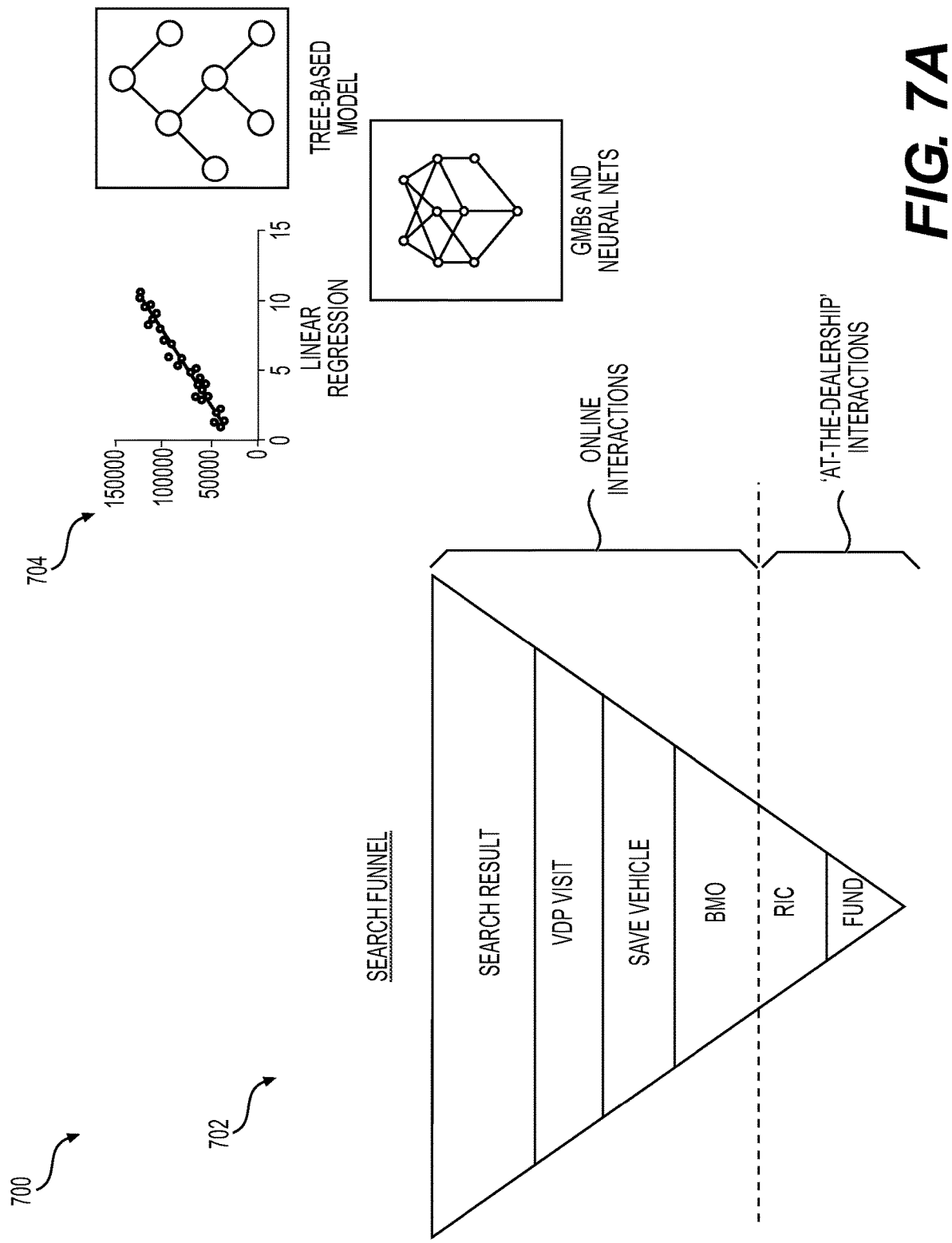
FIGS. 7A and 7B depict an example of a search funnel for online vehicle sales and a path analysis model used to evaluate down-funnel impacts, according to one or more embodiments.
Figure 7B:
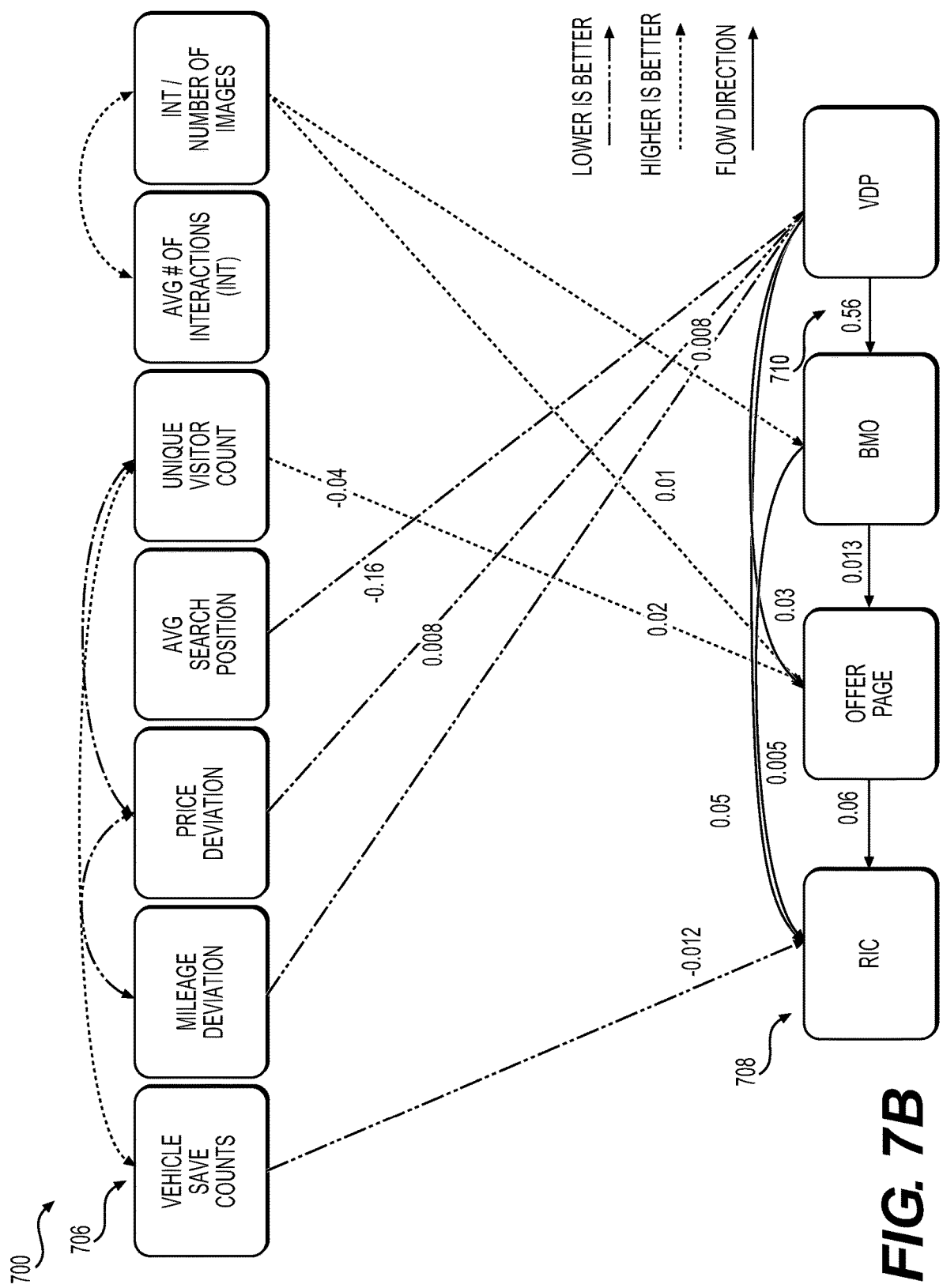

FIGS. 7A and 7B depict an example 700 of a search funnel for online vehicle sales and a path analysis model used to evaluate down-funnel impacts, according to one or more embodiments. For example, FIGS. 7A and 7B illustrate an example path analysis performed in connection with training the model to understand the relative importance and causal power of each interaction variable for an item. A path analysis may include a multiple regression statistical analysis that evaluates relationships between multiple variables. In a path analysis, users may be able to specify a hypothetical path diagram and the path analysis may output a strength between the various nodes in the path diagram. By performing a path analysis in a step-by-step process, the path analysis may capture some of the causal power between steps.

FIG. 7A illustrates, at 702, an example search funnel of different portions of a search process, e.g., for a vehicle. For example, the search funnel at 702 may include online interactions (e.g., user interactions with a website for vehicle searching) and 'at-the-dealership' interactions. The online interactions may include viewing search results, interacting with particular search results by visiting a VDP, saving vehicles (e.g., to a user profile) from the search, and building an offer for sale of the vehicle (BMO). The 'at-the-dealership' interactions may include viewing the vehicle at the dealership (RIC) and receiving a funding offer (FUND) (e.g., from a financial institution). Certain embodiments may evaluate the portions of the process in the search funnel to determine which online interaction(s) have a causal relationship with the 'at-the-dealership' interactions. In other words, the path analysis described herein may help to predict which vehicles a customer is likely to select from a set of search results and actually visit at a dealer, which may help to increase a likelihood of a sale.

After determining which on-line interactions have the causal relationship, certain embodiments may include, at 704, determining a type of model (e.g., a linear regression model, a tree-based model, and/or GBMs and neural nets) to use for generating relevance scores. For example, various types of models may be compatible with certain embodiments described herein and the determining at 704 may include determining which type of model to use (e.g., determining which type of model is suitable for the intended use). Continuing with the previous example, certain embodiments may include determining which type of model satisfies one or more performance metrics, such as accuracy, time to output a result, production effort, and/or the like, in order to determine which type of model is suitable for the intended use.

As an example of the selection of a model type, certain embodiments may evaluate linear regression models (e.g., where one model may be fit to the entire population of data and one set of coefficients may be built or utilized), gradient boosting machine models (e.g., where one GBM model may be built for each query group, such as a make/model/body style (BS)/condition combination), grouped linear regression models based on number of VDP views, and grouped linear regression models based on pentiles for the number of VDP views using historical data to minimize SRP tile position using VDP views as the target variable. The grouped linear regression models may build one linear regression model for each query group and one set of coefficients may be used for each, e.g., make/model combination for vehicles. In other words, the goal for evaluation of the various model types may include minimizing overall SRP tile positions (when the customer views the VDP) and, e.g., 5 days' worth of searches may be used to evaluate out-of-time (OOT) performance of the models.

Assume, for example, that the OOT performance for SRP tile position for the various model types is as follows: a mean of 25 and a median of 10 for the linear regression models, a mean of 7 and a median of 4 for the gradient boosting machine models, a mean of 20 and a median of 8 for the grouped linear regression models based on the number of VDP views, and a mean of 4 and a median of 3 for the grouped linear regression models based on VDP pentiles. Based on the OOT performance for the SRP tile position, certain embodiments may determine that the grouped linear regression model is the best suited type of model based on having the lowest mean and/or median values for the OOT-performance for the SRP tile position. However, in certain embodiments, the selection of the type of model may be based on one or more other factors in addition to, or as an alternative to, the measured metrics. For example, the selection may be based on a preferred implementation platform for the types of models (e.g., search API platform or machine learning platform), whether the models have stream capability, whether the models have personalization capabilities, an ease of implementation and/or maintenance of the models, and/or the like. As a specific example for the basic linear regression model, this type of model may be preferably implemented on a search API, may have scoring on stream capabilities, may have personalization capabilities, and may be easy to implement (e.g., may just need coefficients). However, this type of model may not perform well on complex cases for combinations of characteristics of the items (e.g., make, model, BS, and condition combinations for vehicles). For example, a complex case may include a vehicle that may be classified into multiple categories of vehicles (e.g., some compact cars may be classified as either a sedan or a coupe) or vehicles with search counts below a threshold. These complex cases may reduce the effectiveness of model training by reducing the number of categories of vehicles that have a sufficient number of category members, for example.

As a specific example for the grouped linear regression models, these types of models may be preferably implemented on a search API, may have scoring on stream capabilities, may have personalization capabilities, may be easy to moderately difficult to implement, and may perform well on rare combinations of characteristics (e.g., make, model, BS, and condition combinations for vehicles). However, this type of model may be less interpretable than linear regression models. As a specific example for the GBM ranker models, these types of models may be preferably implemented on a machine learning platform, may not have scoring on stream capabilities, and hence may not have personalization capabilities, may be difficult to implement, and may perform well on rare combinations of characteristics (e.g., make, model, BS, and condition combinations vehicles).

FIG. 7B illustrates an example of identifying target variables to use for training a model described herein. For example, reference number 706 illustrates various supporting variables used in the path analysis for possible target variables illustrated at reference number 708. As illustrated, the path provided to a model may include VDP visits based on search, building a sale offer, visiting the offer page, and visiting the dealer (RIC). As further illustrated at 710, the path analysis may identify VDP has having the strongest impact on subsequent activities of a customer. In the example 700, VDP views may have a strong effect on RIC, BMO, and offer page activities. In some embodiments, VDP views may be further evaluated for particular user clicks on each VDP.

With VDP as the target variable, certain aspects related to a model may be considered in connection with building the model. For example, data may be sampled from a time period (in-time data) and outside of the time period (out-of-time data). For the target variable, sub-variables may be identified and evaluated (e.g., number of VDP views for vehicles that are still in inventory and/or group-wise VDP view deciles (0 to 5) for vehicle characteristic combinations). For the target variable, certain metrics may be used for evaluation, such as mean squared error for the number of VDP views and/or normalized discrete cumulative gain (NDCG) for the VDP view deciles. Other metrics, such as mean and median click position for VDP views may be used for evaluation.

Certain embodiments may then train the model selected in connection with FIG. 7A to evaluate values for the target variable (e.g., VDP). For example, certain embodiments may train a model to receive an input of a number of VDP views for various vehicles included in a set of search results and output a relevance score for each of the vehicles, which certain embodiments may use to rank order the vehicles for presentation to a user. In this way, certain embodiments may train a model to use a target variable (e.g., VDP for a vehicle search) for determining a relevance score (e.g., a VDP that is predicted to have a higher likelihood of being visited by a customer may be associated with a higher relevance score).

As a specific example for building a linear regression model, certain embodiments may perform feature selection (e.g., using a VARselect computing package) or feature transformation, may perform hyperparameter tuning (e.g., intercept and/or normalize), and may build the model. As a specific example for building a GBM ranker model, certain embodiments may use an evaluation metric, e.g., NDCG, may perform hyperparameter tuning (e.g., objective, learning rate, sample by tree, maximum depth, number of estimators, sub-sample, etc.), and may build the model. As a specific example for building a group linear regression model, certain embodiments may use an evaluation metric, e.g., NDCG, may perform hyperparameter tuning (e.g., intercept and/or normalize), and may build the model.

The example 700 described above is provided merely as an example, and may include additional, fewer, different, or differently arranged aspects than depicted in FIGS. 7A and 7B.

Figure 8A:
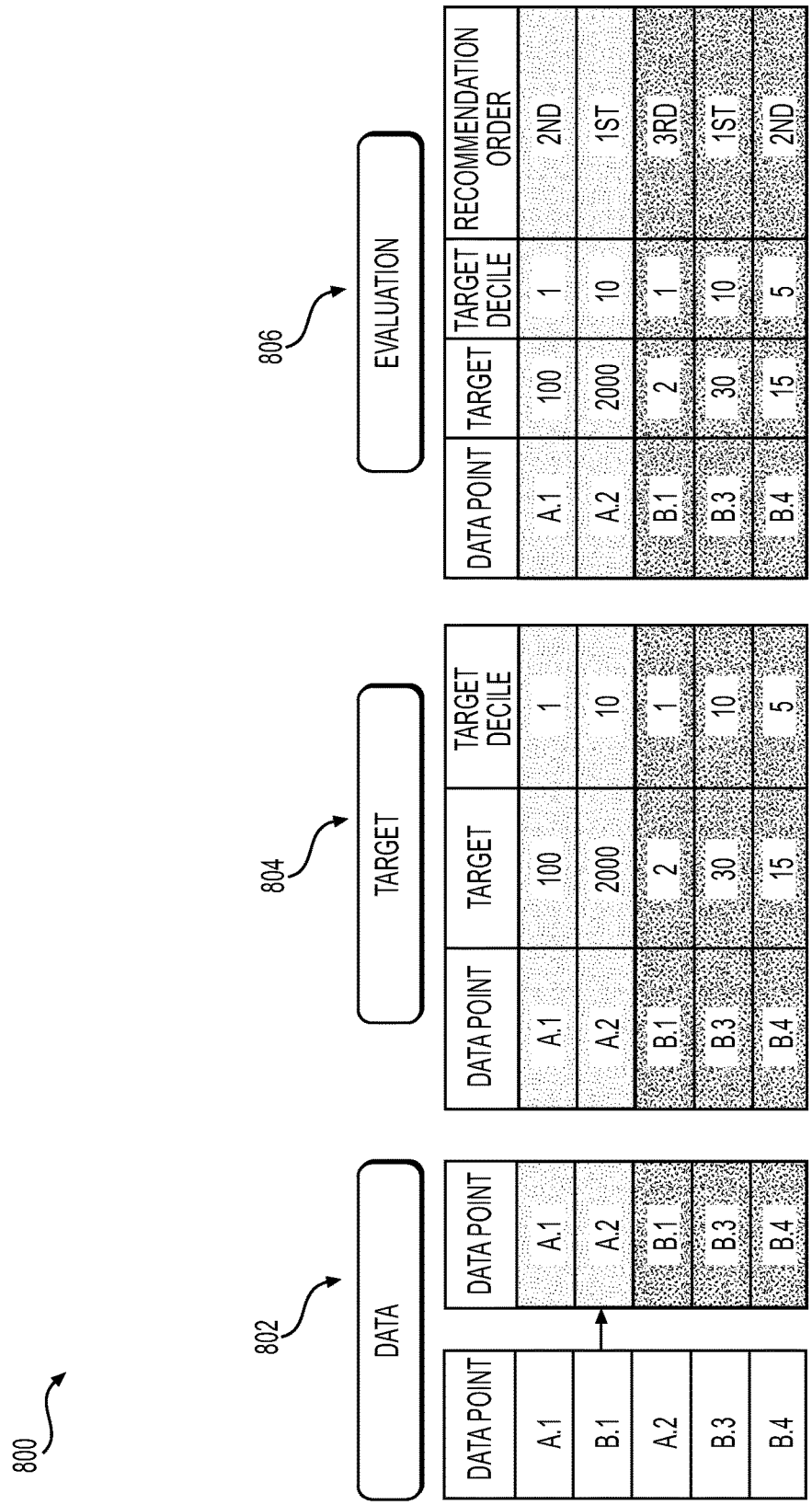
FIGS. 8A and 8B depict an example of recommended sorting of data related to items, according to one or more embodiments.
Figure 8B:
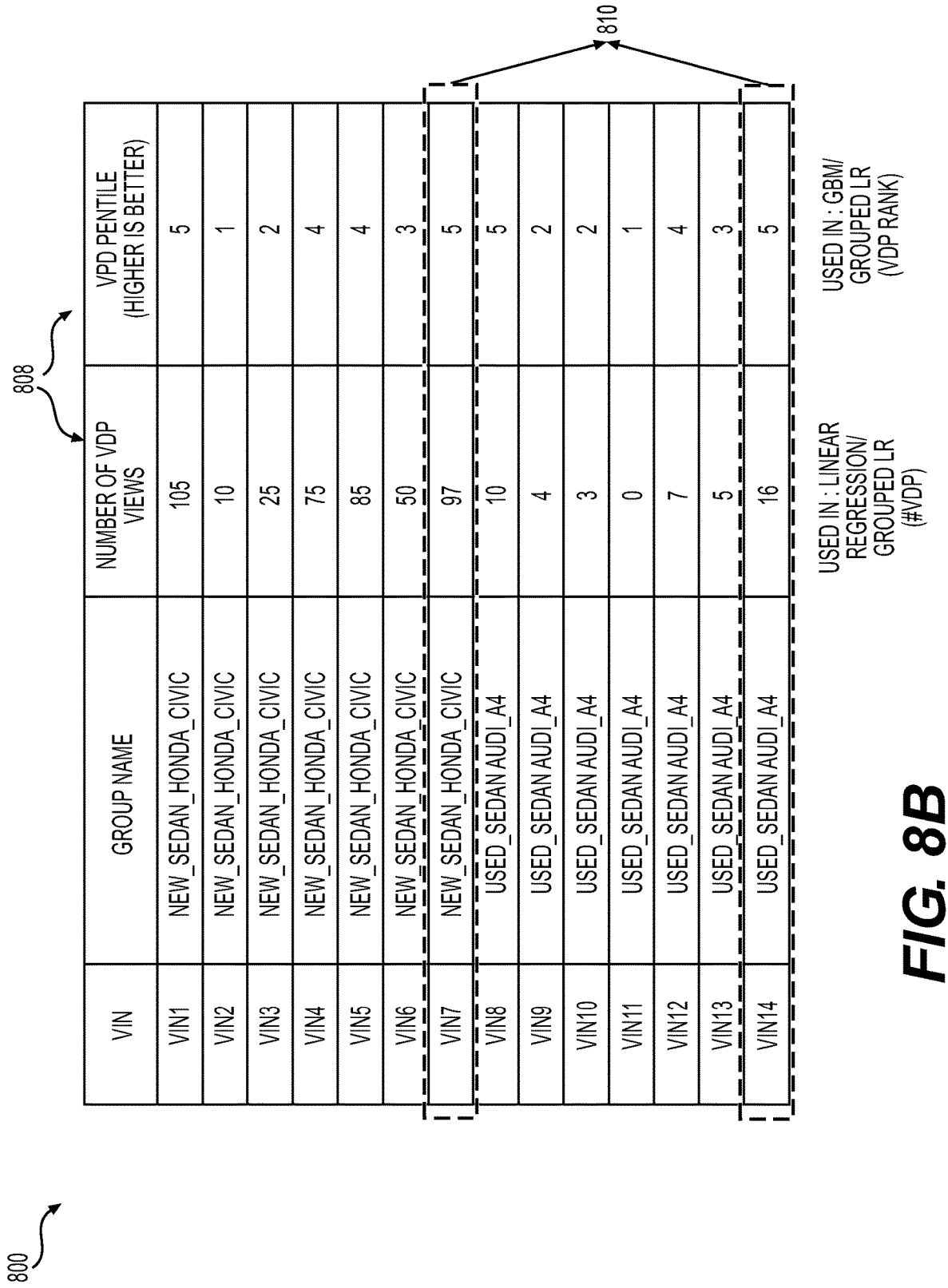

FIGS. 8A and 8B depict an example 800 of recommended sorting of data related to items, according to one or more embodiments. For example, FIG. 8A illustrates, at 802, ordering data into groups (e.g., group A comprising A.1, A.2, and A.3 and group B comprising B.1, B.2, B.3, and B.4). This may help to ensure that model performance on smaller groups is not biased by the largest group in the data. As illustrated at 804, the ordered data may be processed and scored according to a target variable, where the relevance score is illustrated in the "Target" column. This may help to normalize the data for popularity of different groups. As illustrated at 806, the processed data may be evaluated and ordered based on the relevance score on group-by-group basis. For example, certain embodiments may determine a target decile for each of the relevance scores within a group and may determine an order of each data element in a group based on the decile (e.g., a higher decile may be associated with a higher relevance score and a higher target variable value and may be assigned a higher rank).

As illustrated in FIG. 8B at 808, certain embodiments may determine a pentile for values of the target variable (e.g., predicted (or historical) number of VDP views). As illustrated at 810, different groups of items (e.g., vehicles) in data may be associated with different numbers of VDP views, but may be associated with the same pentile (or decile), depending on other group members. Group-based ranking may allow for comparison across different groups or combinations of variables without biasing the model towards popular inventory, which may help to improve performance of the model.

The example 800 described above is provided merely as an example, and may include additional, fewer, different, or differently arranged aspects than depicted in FIGS. 8A and 8B.

Figure 9:
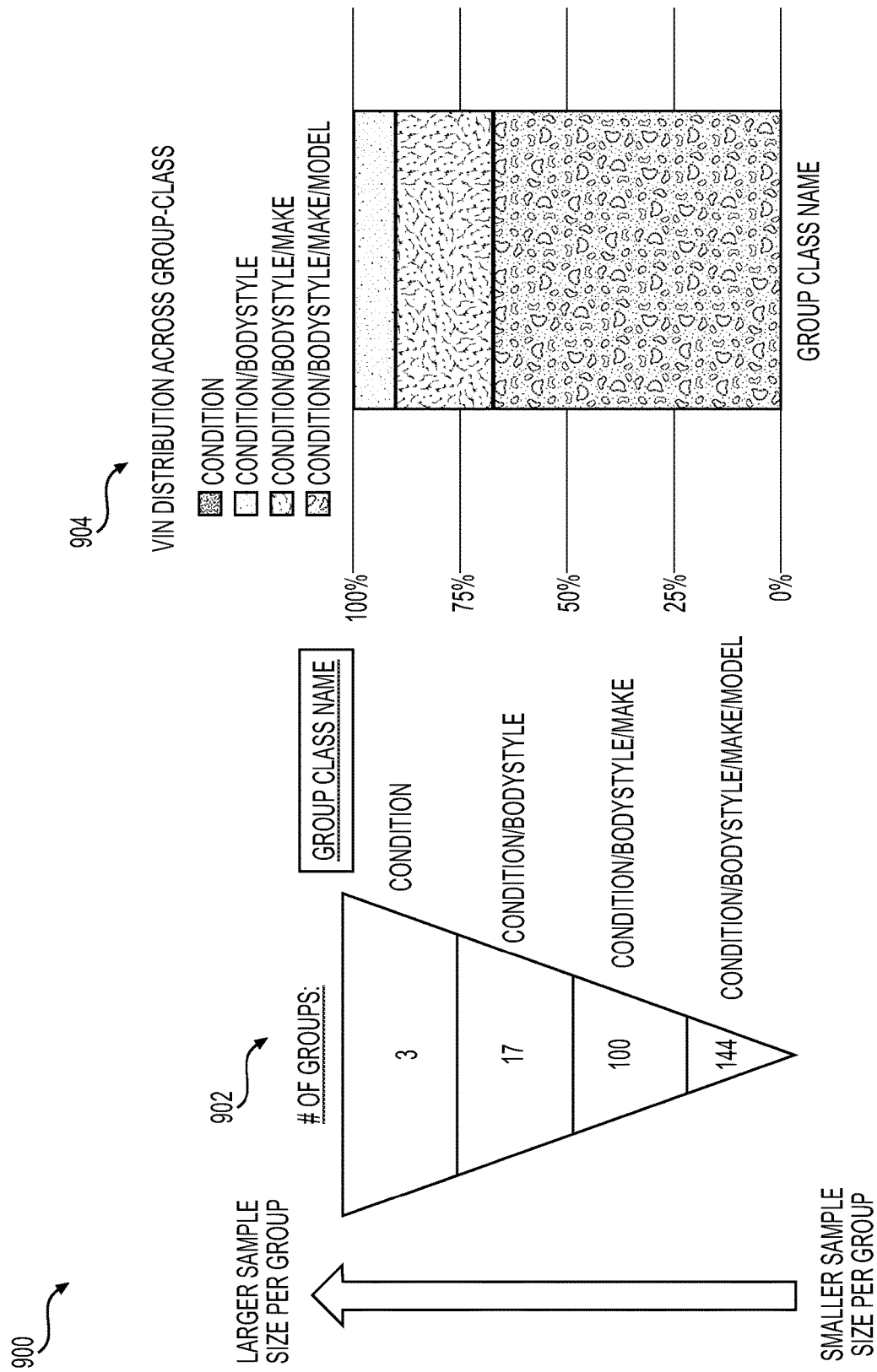
FIG. 9 depicts an example of configuring a model to account for small sample sizes, according to one or more embodiments.

FIG. 9 depicts an example 900 of configuring a model to account for small sample sizes, according to one or more embodiments. For example, FIG. 9 illustrates certain aspects related to solving problems that may be caused by small sample sizes during configuration of a model. During configuration of the model, groups may be combined until a sufficient sample size is reached. For example, and as illustrated at 902, the number of groups may increase as additional variables are grouped together (e.g., compare the number of groups for condition (3) with the combination of condition and body style (17)). However, with a larger number of groups, there may be a smaller sample size per group. As one issue, some groups of vehicles may be rarer than others. For example, out of more than 1,500 groups based on condition/body style/make/model, only 150 groups may include 10,000 or more vehicles available for building models. As another issue, there may be a low search count for some groups of vehicles. In order to reduce or eliminate these issues, certain embodiments may include building models just on groups that have a threshold number of samples and generalizing to a broader group until sufficient samples are available. For example, certain embodiments may identify a combination of variables (e.g., search filters) that are popular among users, and that have a sufficient sample size and a usable number of groups. This may also reduce the number of models that may have to be built by reducing or eliminating a need to build models for groups that do not have the threshold sample size. In this way, certain embodiments may select the number of groups based on the resulting sample size per group such that each group has a sufficient number of members for training of a machine learning model.

As a specific example of selecting the number of groups based on resulting sample size, generic coupe-style vehicles may be more common than a specific brand of coupe-style vehicles. Since the generic coupe-style vehicles may be more common than the specific brand of coupe-style vehicles, certain embodiments may score VINs for the specific brand of coupe-style vehicles in a model built using the generic coupe-style vehicles, which may provide for improved sorting of vehicles since the model would be built on more samples relative to the number of samples used for separate models built for each brand of coupe-style vehicles. The graph at 904 illustrates an example of the proportion of VINs that were scored using different types of models (e.g., a model built for a specific brand of coupe-style vehicles, a model built for all vehicles of the specific brand, a model built for the generic coupe-style vehicles, etc.). In this case, most VINs may be scored by a specific model relating to their condition/body style/make/model since this may be the most common combination of variables, followed by condition/body style/make (e.g., rare models of vehicles may be scored according to the condition/body style/make combination of variables).

The example 900 described above is provided merely as an example, and may include additional, fewer, different, or differently arranged aspects than depicted in FIG. 9.

Figure 10:
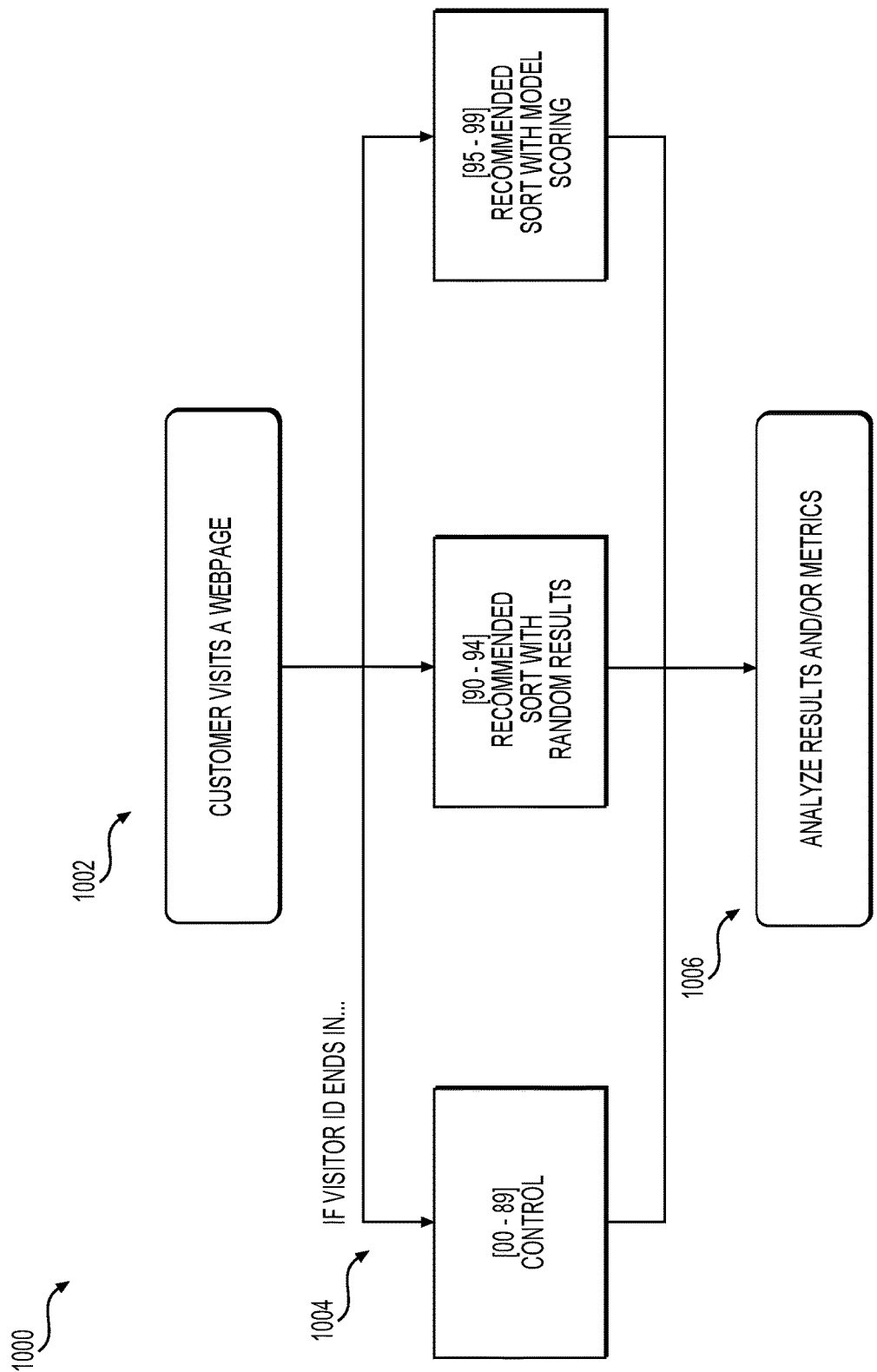
FIG. 10 depicts an example of utilizing a model for A/B testing and updating of the model, according to one or more embodiments.

FIG. 10 depicts an example 1000 of utilizing a model for NB testing and updating of the model, according to one or more embodiments. For example, after a model is trained, certain embodiments may utilize the model in NB testing either before deployment to a user or as part of a deployment to the user. The NB testing may test an effectiveness of various methods of ordering search results (e.g., based on SRP as the target variable or based on another target variable) presented to the user in order to evaluate how well the model determines relevance scores for items (e.g., in terms of click-through-rate (CTR), median VDP click position, etc.). For example, the results of the A/B test may include metrics related to whether a user views VDPs for vehicles with higher relevance scores, and the metrics may be used to adjust the training of the model in order to improve the scoring by the model.

As illustrated at 1002, the A/B testing may detect that a customer visits a webpage for a search of items. As illustrated at 1004, the testing may be partitioned based on the value of a visitor identifier (ID) for the customer. For example, if the visitor ID ends in a value from 00 to 89, the visitor's activities may use a control sort, if the visitor ID ends in a value from 90 to 94, the visitor's activities may use a random recommended sort of search results, and if the visitor ID ends in a value from 95 to 99, the visitor's activities may use a recommended sort of search results according to model scoring. As illustrated at 1006, the A/B testing may include analyzing results and/or metrics (e.g., click through rates to other pages, follow-through to other portions of a vehicle purchase process, etc.) related to various website visits and/or searches. For example, certain embodiments may include performing a swap-set analysis on a sample of searches across different search queries and sort types to determine an overlap between different sort types, to determine whether an overall VDP position is increased, and/or the like. Additionally, or alternatively, and as another example, certain embodiments may evaluate Shapley additive explanation (SHAP) values for a model, where the SHAP values may indicate an impact of a variable on the model output. In a vehicle context, the variables may include vehicle image count number, average vehicle mileage number, price variance ratio, vehicle mileage number, vehicle sale amount, current month book value, average overall search rank, vehicle exterior color, price deviation, and/or the like. Continuing with the vehicle context example, certain embodiments may identify a feature value of the variables and may determine value indicators for a customer based on the variables that have high feature values. A model described herein may then be configured to determine recommended search results based on the analysis results and/or metrics.

Metrics for the A/B testing may include, in a vehicle context, median SRP to VDP tile position, VDP or save count/total searches, RIC rate (e.g., a rate of customers visiting a dealership for a vehicle), and/or purchase funding rate (e.g., a rate of customers requesting a sale offer or a financing offer for a vehicle). Each of the metrics may be associated with segmentations, rollout criteria, action/iterate criteria, and/or rollback criteria. For example, for the median SRP to VDP tile position may have the following segmentations: anonymous or authenticated credit statement, median searches/session, and/or car score tier; may have the following rollout criteria: if criteria is triggered, continue with recommended sort as default or accept risk and continue testing; may have the following action/iterate criteria: if test is better than control with 90 percent (%) confidence; and may have the following rollback criteria: if a test is 25% worse than control with 90% confidence. As another example, the VDP or save count/total searches metric may have the same segmentations, rollout criteria, action/iterate criteria, and rollback criteria as the median SRP to VDP tile position. As another example, the RCI rate metric may have the segmentations: credit segment and care score tier; and may not be associated with any rollout criteria, action/iterate criteria, and rollback criteria. As another example, the fund rate metric may have the same segmentations, rollout criteria, action/iterate criteria, and rollback criteria as the RCI rate.

Other example evaluation metrics in a vehicle context may include determining the average/median click position in the search results page (e.g., average or median position of a result that the user clicked on) where the customer viewed the VDP, requested an offer, and/or saved the vehicle. As another example, an evaluation metric in a vehicle context may include whether testing or validation are currently being performed so that models can be built or utilized.

The example 1000 described above is provided merely as an example, and may include additional, fewer, different, or differently arranged aspects than depicted in FIG. 10.

Figure 11A:
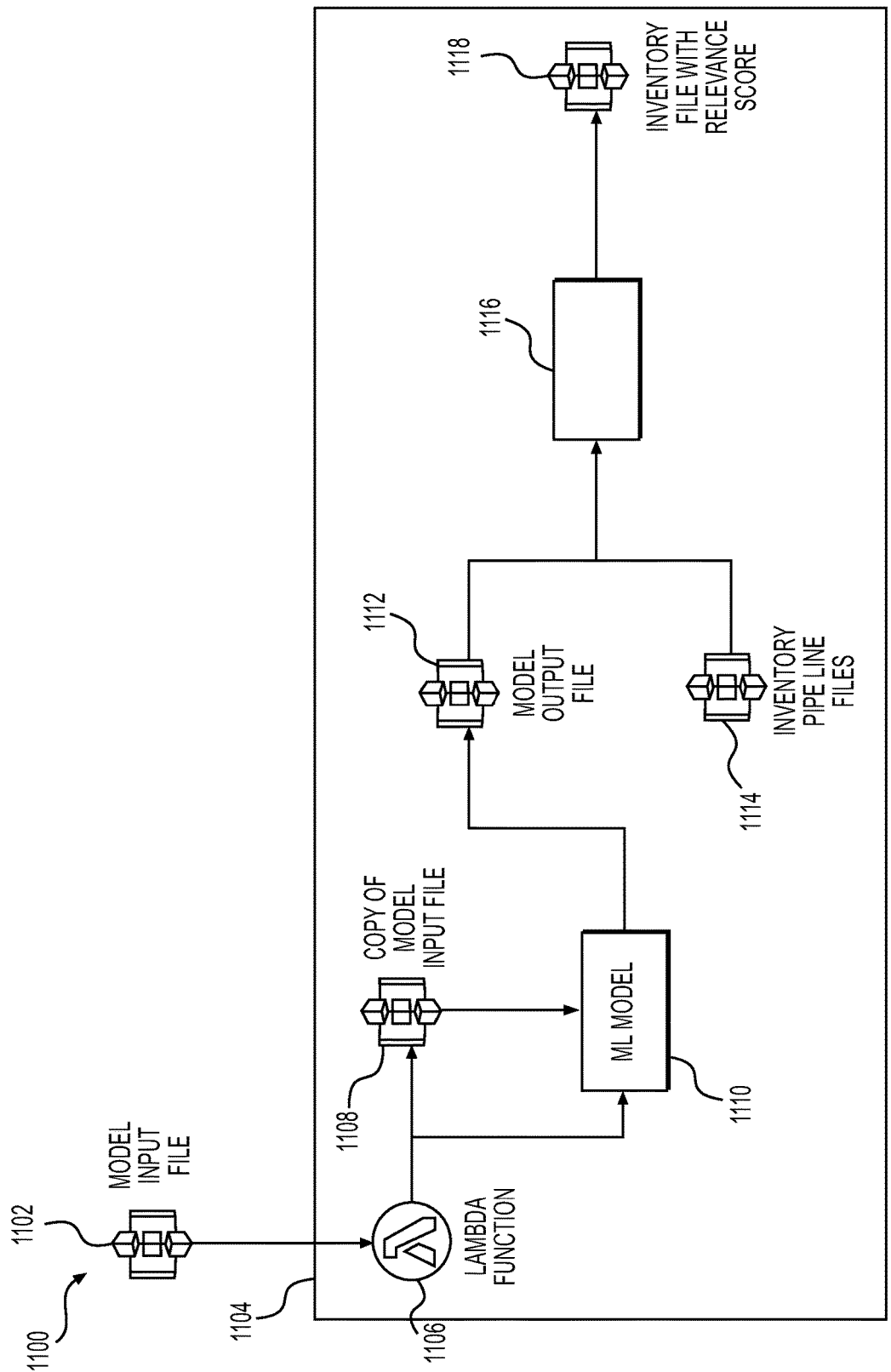
FIGS. 11A and 11B depict example implementations of a model in a computing system, according to one or more embodiments.
Figure 11B:
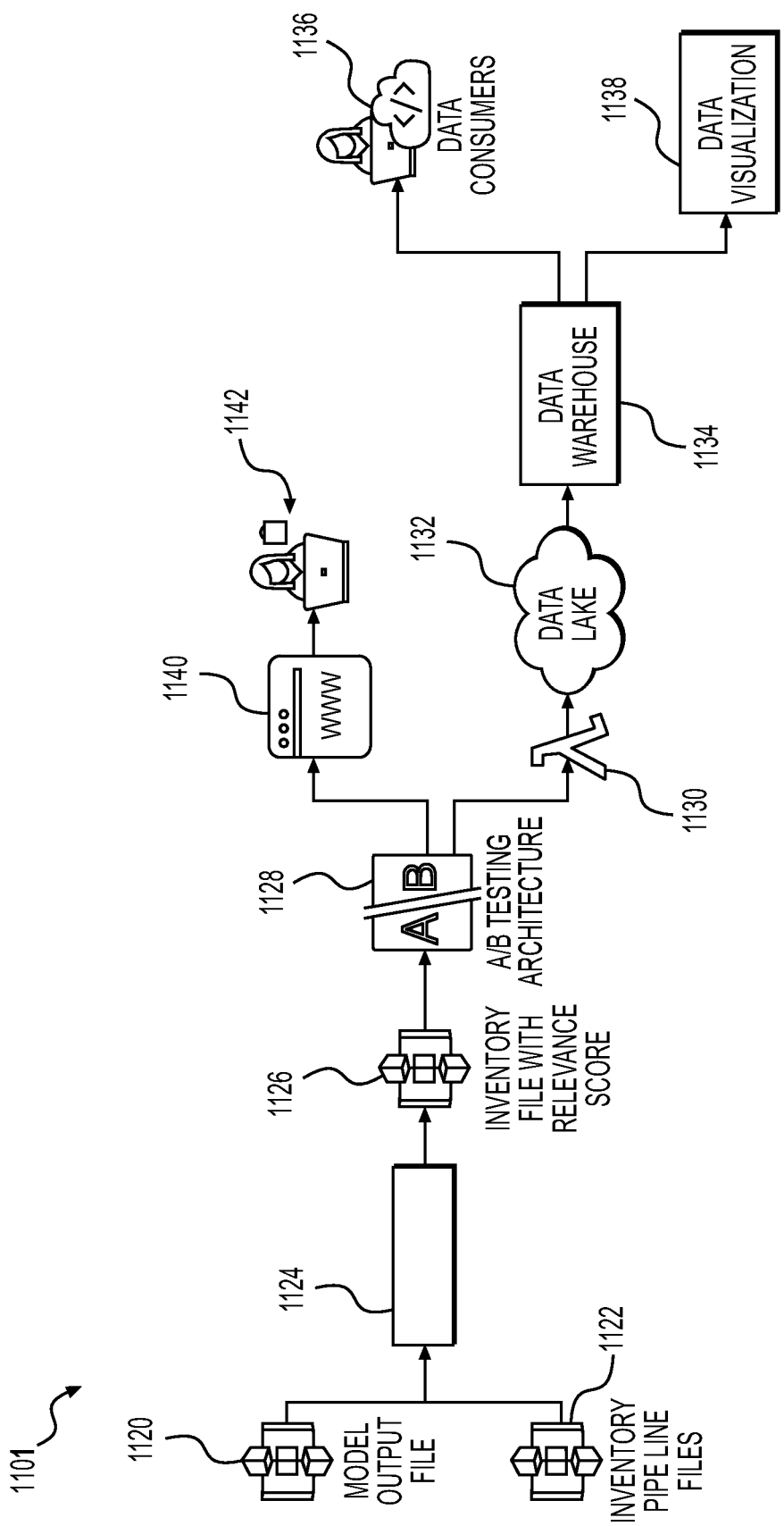

FIGS. 11A and 11B depict example implementations 1100 and 1101 of a model in a computing system, according to one or more embodiments. FIG. 11A illustrates an implementation 1100 built on a distributed infrastructure. The implementation 1100 may include a model input file 1102 (e.g., data related to a plurality of items). The model input file 1102 may be input to a data processing pipeline 1104, and more particularly to a serverless function 1106 (e.g., a lambda function). The serverless function 1106 may be used for data loading purposes. Output from the serverless function 1106 may include a copy 1108 of the model input file 1102 and may be provided to a machine learning (ML) model 1110 (e.g., for determination of relevance scores). Output from the ML model 1110 may include a model output file 1112 comprising relevance scores. This output file 1112 may be provided to a data processing pipeline 1116. In addition, inventory pipeline files 1114 may be provided to the data processing pipeline 1116. The inventory pipeline file 1114 may include data related to an inventory of items. For example, the inventory pipeline file 1114 may include identifiers for the items, identifiers for the groups of the items, values for target variables, and/or the like. The data processing pipeline 1116 may combine the model output file 1112 and the inventory pipeline files 1114, e.g., so that the inventory data includes a relevance score, pentile/decile values, and/or the like for each item. The data processing pipeline 1116 may output an inventory file 1118 that includes the relevance scores.

As illustrated in FIG. 11B, the implementation 1101 may include a model output file 1120 and inventory pipeline files 1122. These files may be similar to the model output file 1112 and inventory pipeline files 1114, respectively, described elsewhere herein. The files 1120, 1122 may be input to a data processing pipeline 1124, which may be similar to the data processing pipeline 1116 described elsewhere herein. For example, the data processing pipeline 1124 may combine relevance scores in the model output file 1120 with inventory data in the inventory pipeline files 1122 and may output an inventory file 1126 that includes the relevance scores.

As further illustrated, certain embodiments may input the inventory file 1126 to NB testing architecture 1128. The NB testing architecture 1128 may operate, e.g., in a manner similar to the A/B testing described in connection with FIG. 10. Output from the A/B testing architecture 1128, which may include data related to user interactions with search results provided for display (e.g., for display via a web browser 1140 used by a customer at 1142), may be provided to a serverless function 1130 (e.g., a lambda function). A serverless function 1130 may perform an operation when a new file is loaded into a storage location it is monitoring. The serverless function 1130 may monitor for new file uploads and may move the file to a storage location accessible by a machine learning model. For example, the serverless function 1130 may store an uploaded file in a data lake 1132 and/or in a data warehouse 1134. Data from the data lake 1132 and/or the data warehouse 1134 may be provided to data consumers 1136 (e.g., based on search queries submitted to a search engine) and/or to a data visualization platform 1138 (e.g., for generation of reports, graphs, plots, and/or the like related to the data stored in the data lake 1132 and/or data warehouse 1134), data accessed by the data consumers 1136 or data related to the activities of the data consumers 1136 (e.g., number of queries submitted, most/least popular search query terms, etc.).

The example implementations 1100, 1101 described above are provided merely as examples, and may include additional, fewer, different, or differently arranged aspects than depicted in FIGS. 11A and 11B.

Figure 12:
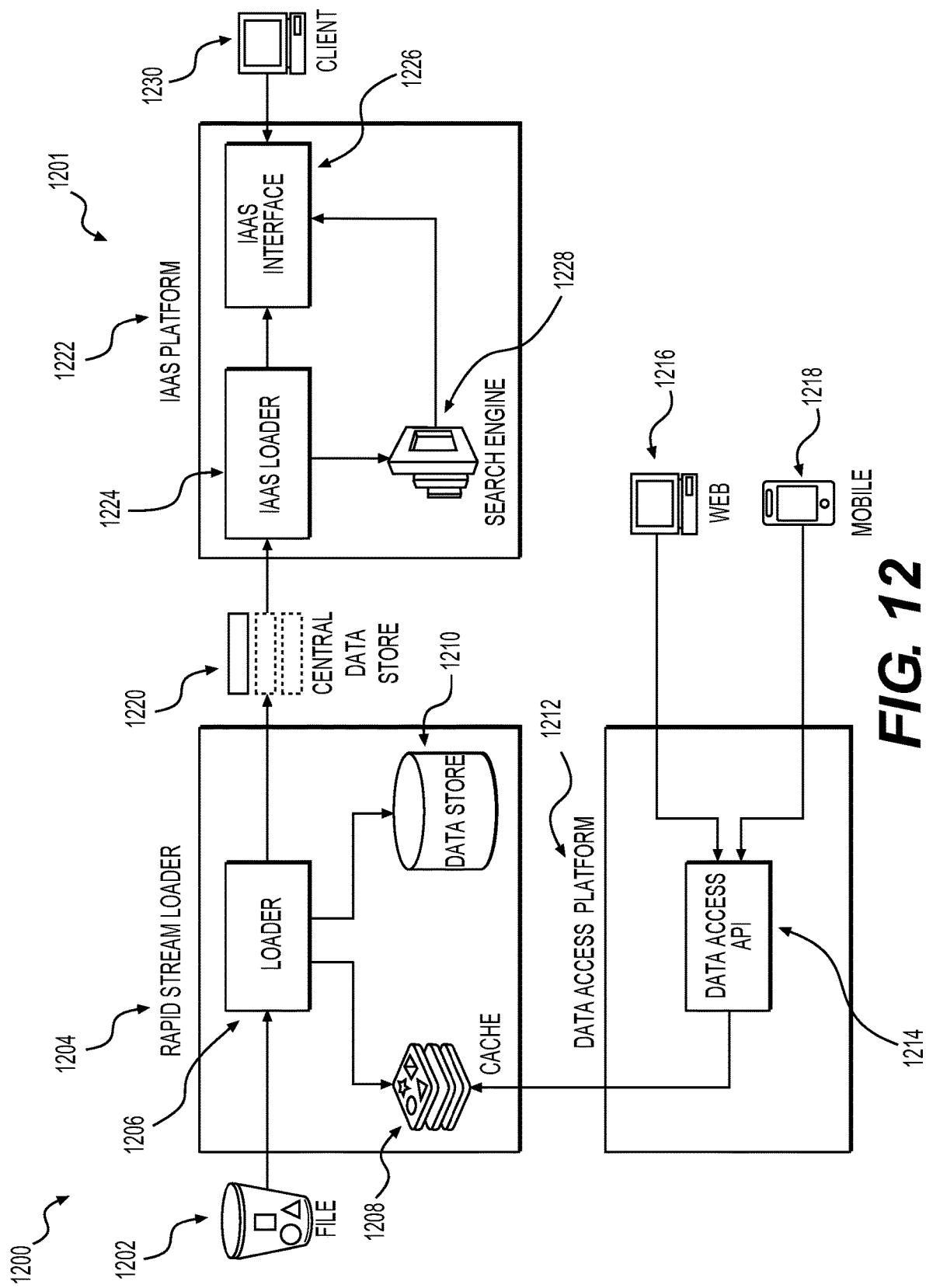
FIG. 12 depicts examples of scoring implementations in a computing system, according to one or more embodiments.

FIG. 12 depicts example implementations 1200, 1201 of scoring implementations in a computing system, according to one or more embodiments. The first scoring implementation 1200 may add new item (e.g., vehicle) scores as columns in a file 1202. Certain embodiments may provide the file 1202 to a rapid stream loader 1204, and more particularly to a loader component of the rapid stream loader 1204. The loader component 1206 may provide the file to a cache 1208 and/or to a data store 1210 (e.g., a database). The loader component 1206 may additionally provide the file 1202 to a central data store 1220 (e.g., a database).

In the first implementation 1200, a user may access data in the cache 1208, e.g., via a website at 1216 or an application on a mobile device at 1218. The user may access the data through a data access API 1214 associated with a data access platform 1212. For example, the user may submit a search query to the data access API 1214, and the data access platform 1212 may retrieve the data from the cache 1208 based on the search query. In some embodiments, the loader component 1206 may load data into the cache 1208 from the data store 1210 based on search criteria provided to the loader component 1206 from the data access platform 1212.

The second implementation 1201 may include an inventory-as-a-service (IaaS) platform 1222 for, e.g., accessing data related to an inventory of items. The IaaS platform 1222 may include an IaaS loader 1224 that may load data from the central data store 1220 based on a search query or other user interactions input to the IaaS interface 1226 via the client device 1230. A search for data in the central data store 1220 may be processed using a search engine 1228. For example, the client device 1230 may provide search criteria to the search engine 1228 via the IaaS interface 1226 and the search engine 1228 may format the search criteria or generate instructions for the IaaS loader 1224 to gather the data from the central data store 1220.

The example implementation 1200 described above is provided merely as an example, and may include additional, fewer, different, or differently arranged aspects than depicted in FIG. 12.

In this way, certain embodiments may determine an order for search results related to an inventory of items based on relevance scores determined for each of the items. In particular, certain embodiments may determine the relevance score based on historical or predicted values for a target variable. This may improve the presentation of search results to a user (e.g., items with higher relevance scores may be ranked higher in the search results), which may conserve computing resources that would otherwise be consumed as a result of a user having to iterate through more poorly ranked search results. In addition, certain embodiments may pre-determine the relevance scores (e.g., based on an average user) and may use the pre-determined relevance scores to pre-rank the search results. This may reduce latency and conserve computing resources associated with providing search results to a user compared to systems that rank search results for each search.

In addition, certain embodiments may provide more relevant and effective search results through use of models that generate relevance scores, by using NB testing to collect randomized data and evaluate the data, and/or continuously adapt to changing customer needs. Furthermore, certain embodiments may build a self-servable search data platform by evaluating customer behavior indicators and/or making search data more transparent and easily accessible to analysts. In addition, certain embodiments may provide personalized searching by collecting unbiased data using A/B testing and/or using processing that can provide real-time model scoring. Certain embodiments may also provide personalized search results through continuously adapting to changing customer preferences and inventory (e.g., continuously re-fitting the models). These aspects may also improve the customer experience. With respect to operations of an organization related to selling an item, certain embodiments may help to increase sales by providing more relevant items at higher positions in search results.

Figure 13:
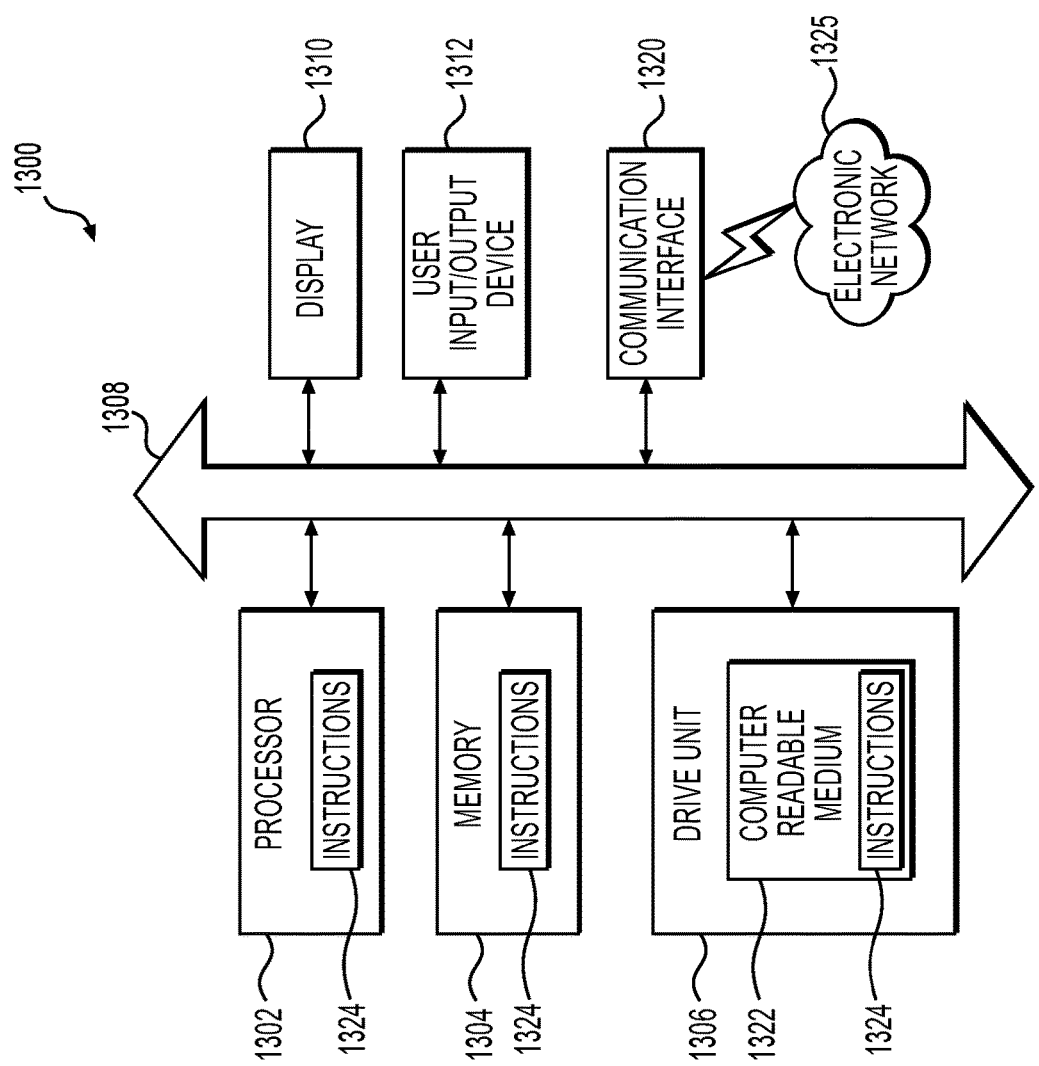
FIG. 13 depicts an example of a computing device, according to one or more embodiments.

FIG. 13 depicts an example of a computer 1300, according to certain embodiments. FIG. 13 is a simplified functional block diagram of a computer 1300 that may be configured as a device for executing processes or operations depicted in, or described with respect to, FIGS. 1-12, according to exemplary embodiments of the present disclosure. For example, the computer 1300 may be configured as the user device 102, server device 104, and/or another device according to exemplary embodiments of this disclosure. In various embodiments, any of the systems herein may be a computer 1300 including, e.g., a data communication interface 1320 for packet data communication. The computer 1300 may communicate with one or more other computers 1300 using the electronic network 1325. The network interfaces 114A, B in FIG. 1 may include one or more communication interfaces 1320. The electronic network 1325 may include a wired or wireless network similar to the network 106 depicted in FIG. 1.

The computer 1300 also may include a central processing unit ("CPU"), in the form of one or more processors 1302, for executing program instructions 1324. The processors 110A, B depicted in FIG. 1 may include one or more processors 1302. The computer 1300 may include an internal communication bus 1308, and a drive unit 1306 (such as read-only memory (ROM), hard disk drive (HDD), solid-state disk drive (SDD), etc.) that may store data on a computer readable medium 1322, although the computer 1300 may receive programming and data via network communications. The computer 1300 may also have a memory 1304 (such as random access memory (RAM)) storing instructions 1324 for executing techniques presented herein, although the instructions 1324 may be stored temporarily or permanently within other modules of the computer 1300 (e.g., processor 1302 and/or computer readable medium 1322). The memories 112A, B depicted in FIG. 1 may include one or more memories 1304. The computer 1300 also may include user input and output ports 1312 and/or a display 1310 to connect with input and output devices such as keyboards, mice, touchscreens, monitors, displays, etc. The displays 108A, B may include one or more displays 1310. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to processing data for a search, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to processing data related to a plurality of physical items using a machine learning model, any suitable activity may be used. In an exemplary embodiment, instead of or in addition to processing data related to a physical item, certain embodiments include processing data related to electronic items (e.g., digital documents or images) and/or related to services.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for rank ordering a set of search results, comprising:
   receiving, by a server device, data related to a plurality of items;
   providing the data as input to a trained grouped linear regression model, wherein the trained grouped linear regression model (i) groups the plurality of items into a plurality of groups of items according to one or more item variables associated with the plurality of items defined by the data, each of the plurality of groups of items including a subset of the plurality of items associated with a type of the one or more item variables, and (ii) generates a score associated with a target variable for each of the plurality of items using a grouped linear regression applied on a group by group basis for the plurality of groups of items, the score, within a given group of the plurality of groups of items, being further based on sub-divisions of the given group, and the score for each of the plurality of items being relative within each of the plurality of groups of items;
   receiving, as output of the trained grouped linear regression model, the score for each of the plurality of items;
   storing the output of the trained grouped linear regression model in a data store, each entry in the data store including at least an item identifier for an item of the plurality of items, a group name for the item associated with one of the plurality of groups of items into which the item was grouped, and the score for the item;
   receiving, from a user device associated with a user, search criteria for a search of the plurality of items, the search criteria associated with one or more types of the one or more item variables;
   identifying, from the data store, one or more groups of items from the plurality of groups of items as a set of search results based on the search criteria;
   determining an order to present, within the set of search results, one or more items of the subset of the plurality of items included in the one or more groups of items identified based on the score for each of the one or more items;
   outputting, for display via the user device, the set of search results in the order; and
   monitoring user interactions with the set of search results displayed via the user device, the user interactions including one or more types of user interactions with one or more items included in the set of search results indicative of a relevance of the one or more items to the user, wherein the trained grouped linear regression model is retrained based on the one or more types of user interactions to cause an adjustment to the score of each of the one or more items output by the retrained grouped linear regression model and stored in the data store for use in future searches.

2. The computer-implemented method of claim 1, wherein the target variable includes one of:
   a number of user selections of an item details page for each of the plurality of items, or
   group-wise user selections of an item details page for each of the plurality of items.

3. The computer-implemented method of claim 2, wherein the item details page comprises a vehicle details page.

4. The computer-implemented method of claim 1, wherein using the grouped linear regression applied on the group by group basis comprises:
   processing first data for a first group of items, of the plurality of groups of items, using a first linear regression processing; and
   processing second data for a second group of items, of the plurality of groups of items, using a second linear regression processing.

5. The computer-implemented method of claim 1, wherein the sub-divisions comprise pentiles or deciles of the plurality of groups of items.

6. The computer-implemented method of claim 1, further comprising:
   configuring the trained grouped linear regression model by:
   performing a path analysis of multiple target variables; and
   selecting the target variable based on a result of the path analysis.

7. The computer-implemented method of claim 1, wherein the plurality of items comprises a plurality of vehicles.

8. The computer-implemented method of claim 7, wherein the plurality of groups of items are based on one or more of:
   a make of each vehicle in the plurality of vehicles,
   a model of each vehicle in the plurality of vehicles,
   a body style of each vehicle in the plurality of vehicles, or
   a condition of each vehicle in the plurality of vehicles.

9. The computer-implemented method of claim 1, wherein the trained grouped linear regression model is a first machine learning model, and the method further comprises:
   receiving user data associated with a user of the user device;
   processing the user data using a second machine learning model trained to generate and output a profile for the user based on the user data; and
   providing the profile for the user to the trained grouped linear regression model, wherein the trained grouped linear regression model is further trained to generate the score for each of the plurality of items based on the profile.

10. The computer-implemented method of claim 9, wherein the user data includes one or more of a location of the user, previous search criteria associated with the user, or user interactions with previous sets of search results.

11. The computer-implemented method of claim 1, wherein the one or more types of user interactions include a selection of an item from the one or more items included in the set of search results indicative of a higher relevance of the selected item than non-selected items.

12. The computer-implemented method of claim 11, wherein the trained grouped linear regression model is retrained based on the selection to one or more of: reduce the score of non-selected items or increase the score of the selected item.

13. A server device, comprising:
   at least one memory storing instructions; and
   at least one processor executing the instructions to perform operations for rank ordering a set of search results, the operations including:
      receiving data related to a plurality of items;
      providing the data as input to a trained grouped linear regression model, wherein the trained grouped linear regression model (i) groups the plurality of items into a plurality of groups of items according to one or more item variables associated with the plurality of items defined by the data, each of the plurality of groups of items including a subset of the plurality of items associated with a type of the one or more item variables, and (ii) generates a score associated with a target variable for each of the plurality of items using a grouped linear regression applied on a group by group basis for the plurality of groups of items, the score, within a given group of the plurality of groups of items, being further based on sub-divisions of the given group, and the score for each of the plurality of items being relative within each of the plurality of groups of items;
      receiving, as output of the trained grouped linear regression model, the score for each of the plurality of items;
      storing the output of the trained grouped linear regression model in a data store, each entry in the data store including at least an item identifier for an item of the plurality of items, a group name for the item associated with one of the plurality of groups of items into which the item was grouped, and the score for the item;
      receiving, from a user device associated with a user, search criteria for a search of the plurality of items, the search criteria associated with one or more types of the one or more item variables;
      identifying, from the data store, one or more groups of items from the plurality of groups of items as a set of search results based on the search criteria;
      determining an order to present, within the set of search results, one or more items of the subset of the plurality of items included in the one or more groups of items identified based on the score for each of the plurality of items in the set of search results;
      outputting, for display via the user device, the set of search results in the order; and
      monitoring user interactions with the set of search results displayed via the user device, the user interactions including one or more types of user interactions with one or more items included in the set of search results indicative of a relevance of the one or more items to the user, wherein the trained grouped linear regression model is retrained based on the one or more types of user interactions to cause an adjustment to the score of each of the one or more items output by the retrained grouped linear regression model and stored in the data store for use in future searches.

14. The server device of claim 13, wherein the target variable includes one of:
   a number of user selections of an item details page for each of the plurality of items, or
   group-wise user selections of an item details page for each of the plurality of items.

15. The server device of claim 14, wherein the item details page comprises a vehicle details page.

16. The server device of claim 13, wherein using the grouped linear regression applied on the group by group basis comprises:
   processing first data for a first group of items, of the plurality of groups of items, using a first linear regression processing; and
   processing second data for a second group of items, of the plurality of groups of items, using a second linear regression processing.

17. The server device of claim 13, wherein the subdivisions comprise pentiles or deciles of the plurality of groups of items.

18. The server device of claim 13, wherein the operations further comprise:
   configuring the trained grouped linear regression model by:
      performing a path analysis of multiple target variables; and
      selecting the target variable based on a result of the path analysis.

19. The server device of claim 13, wherein the plurality of items comprises a plurality of vehicles.

20. A non-transitory computer-readable medium storing instructions that, when executed by a processor, cause the processor to perform a method for rank ordering of search results, the method comprising:
   receiving data related to a plurality of items;
   providing the data as input to a trained grouped linear regression model, wherein the trained grouped linear regression model (i) groups the plurality of items into a plurality of groups of items according to one or more item variables associated with the plurality of items defined by the data, each of the plurality of groups of items including a subset of the plurality of items associated with a type of the one or more item variables, and (ii) generates a score associated with a target variable for each of the plurality of items using a grouped linear regression applied on a group by group basis for the plurality of groups of items, the score, within a given group of the plurality of groups of items, being further based on sub-divisions of the given group, and the score for each of the plurality of items being relative within each of the plurality of groups of items;

receiving, as output of the trained grouped linear regression model, the score for each of the plurality of items;

storing the output of the trained grouped linear regression model in a data store, each entry in the data store including at least an item identifier for an item of the plurality of items, a group name for the item associated with one of the plurality of groups of items into which the item was grouped, and the score for the item;

receiving, from a user device associated with a user, search criteria for a search of the plurality of items, the search criteria associated with one or more types of the one or more item variables;

identifying, from the data store, one or more groups of items from the plurality of groups of items as a set of search results based on the search criteria;

determining an order to present, within the set of search results, one or more items of the subset of the plurality of items included in the one or more groups of items identified based on the score for each of the one or more items;

outputting, for display via the user device, the set of search results in the order; and monitoring user interactions with the set of search results displayed via the user device, the user interactions including one or more types of user interactions with one or more items included in the set of search results indicative of a relevance of the one or more items to the user, wherein the trained grouped linear regression model is retrained based on the one or more types of user interactions to cause an adjustment to the score of each of the one or more items output by the retrained grouped linear regression model and stored in the data store for use in future searches.

* * * * *